(12) United States Patent
Tanji et al.

(10) Patent No.: US 7,477,303 B2
(45) Date of Patent: Jan. 13, 2009

(54) ANTI-ALIASING VIDEO CAMERA PROCESSING APPARATUS AND METHOD

(75) Inventors: Ichiro Tanji, Kanagawa (JP); Fumihiko Sudo, Kanagawa (JP); Taku Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1108 days.

(21) Appl. No.: 10/674,314

(22) Filed: Sep. 30, 2003

(65) Prior Publication Data

US 2004/0061790 A1 Apr. 1, 2004

Related U.S. Application Data

(60) Continuation of application No. 09/026,956, filed on Feb. 20, 1998, now abandoned, which is a division of application No. 08/690,557, filed on Jul. 31, 1996, now Pat. No. 6,515,699.

(30) Foreign Application Priority Data

Jul. 31, 1995 (JP) ............................. P07-195634

(51) Int. Cl.
*H04N 5/202* (2006.01)
*H04N 5/228* (2006.01)
*H04N 9/64* (2006.01)

(52) U.S. Cl. .................... 348/254; 348/222.1; 348/256; 348/674

(58) Field of Classification Search .............. 348/222.1, 348/241, 250, 254–256, 671, 674–676
See application file for complete search history.

(56) References Cited

U.S. PATENT DOCUMENTS 4,415,923 A 11/1983 Noda ....................... 348/675

(Continued)

FOREIGN PATENT DOCUMENTS

DE 43 00 304 7/1994

(Continued)

OTHER PUBLICATIONS

Patent Abstracts of Japan, vol. 013, No. 121 (E-732), Mar. 24, 1989 & JP 63 290469 A (Matsushita Electric Ind Co Ltd), Nov. 28, 1988.

(Continued)

*Primary Examiner*—Lin Ye
*Assistant Examiner*—Kelly Jerabek
(74) *Attorney, Agent, or Firm*—Frommer Lawrence & Haug LLP; William S. Frommer; Thomas F. Presson

(57) ABSTRACT

High frequency components of a video signal are attenuated for avoiding aliasing when the video signal is corrected by a non-linear gamma correction circuit. Such high frequency components arise from the video signal harmonics, and also are generated in image contour processing of the video signal. The high frequency components are band limited, thereby linearizing the gamma correction circuit and preventing aliasing. Up-converting the sampling frequency increases a desired band limitation area and defers the generation of high frequency components that cause aliasing. The non-linear gamma correction function is divided into a plurality of sections which are replaced by respective straight-line segments each represented by a linear expression, and gamma correction is effected with a straight-line segment corresponding to the amplitude of the digital video signal.

12 Claims, 29 Drawing Sheets

U.S. PATENT DOCUMENTS

| | | | | |
|---|---|---|---|---|
| 4,812,903 | A | | 3/1989 | Wagensonner et al. ...... 348/645 |
| 4,855,829 | A | | 8/1989 | Kihara ........................ 348/625 |
| 5,068,718 | A | * | 11/1991 | Iwabe et al. ................. 348/675 |
| 5,087,966 | A | * | 2/1992 | Harradine ................... 348/675 |
| 5,103,299 | A | * | 4/1992 | Asaida ........................ 348/264 |
| 5,175,621 | A | | 12/1992 | Maesato ..................... 348/674 |
| 5,194,943 | A | * | 3/1993 | Tomita et al. ............... 348/255 |
| 5,235,410 | A | | 8/1993 | Hurley ....................... 348/472 |
| 5,235,413 | A | | 8/1993 | Knierim ..................... 348/675 |
| 5,243,426 | A | | 9/1993 | Murayama et al. .......... 348/675 |
| 5,280,353 | A | | 1/1994 | Baldwin ..................... 348/674 |
| 5,345,265 | A | | 9/1994 | Kim ........................... 348/254 |
| 5,349,381 | A | | 9/1994 | Murayama et al. .......... 348/252 |
| 5,420,633 | A | | 5/1995 | Matoba ....................... 348/242 |
| 5,473,372 | A | * | 12/1995 | Nobuoka et al. ............ 348/254 |
| 5,481,317 | A | | 1/1996 | Hieda ......................... 348/674 |
| 5,534,948 | A | | 7/1996 | Baldwin ..................... 348/675 |
| 5,546,135 | A | | 8/1996 | Okamoto et al. ............ 348/674 |
| 5,557,340 | A | | 9/1996 | Millward ................... 348/627 |
| 5,661,575 | A | * | 8/1997 | Yamashita et al. .......... 358/519 |
| 5,710,594 | A | * | 1/1998 | Kim ........................... 348/254 |
| 5,818,521 | A | * | 10/1998 | Hieda ....................... 348/222.1 |

FOREIGN PATENT DOCUMENTS

| | | |
|---|---|---|
| EP | 0 457 522 | 11/1991 |
| EP | 6 605 212 | 7/1994 |
| GB | 2 246 924 | 2/1992 |
| GB | 2 250 886 | 6/1992 |
| GB | 2 258 782 | 2/1993 |
| JP | 56 10789 | 2/1981 |
| JP | 1 206775 | 8/1989 |
| JP | 1 209367 | 8/1989 |
| JP | 4 32372 | 2/1992 |
| JP | 4 45688 | 2/1992 |
| JP | 4 140980 | 5/1992 |
| JP | 4 220882 | 8/1992 |
| JP | 4 355587 | 12/1992 |
| JP | 686096 | 3/1994 |
| JP | 4341814 | 7/1994 |
| JP | 7 67129 | 3/1995 |
| WO | WO 91/03122 | 3/1991 |

OTHER PUBLICATIONS

Patent Abstracts of Japan, vol. 016, No. 204 (E-1202), May 15, 1992 & JP 04 032372 A (Sony Corp), Feb. 4, 1992.
Patent Abstracts of Japan, vol. 095, No. 009, Oct. 31, 1995 & JP 07 143365 A (Sony Corp), Jun. 2, 1995.

* cited by examiner

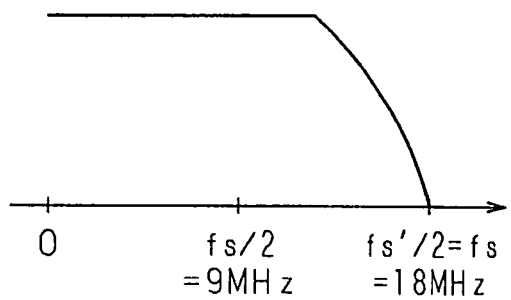
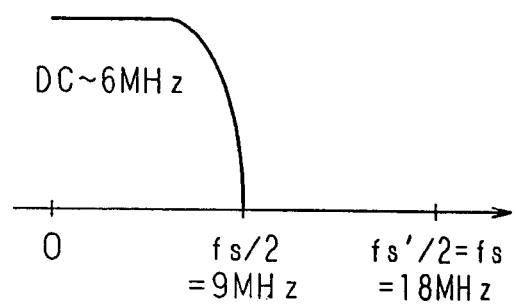
FIG.26A  FIG.26B
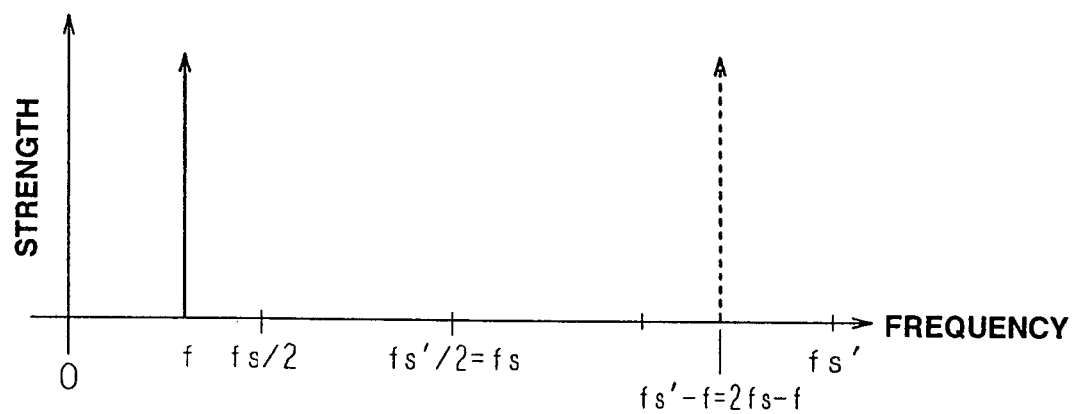
FIG.27A
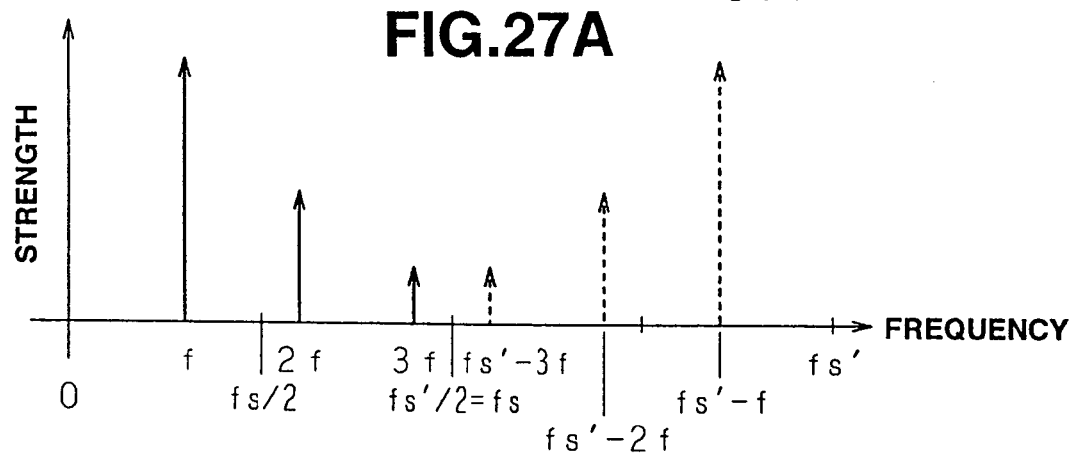
FIG.27B

ANTI-ALIASING VIDEO CAMERA PROCESSING APPARATUS AND METHOD

CROSS-REFERENCE TO RELATED APPLICATION

This application is a continuation application of U.S. patent application Ser. No. 09/026,956, filed Feb. 20, 1998, now abandoned which is a divisional of application Ser. No. 08/690,557, filed Jul. 31, 1996, now U.S. Pat. No. 6,515,699, granted Feb. 4, 2003.

BACKGROUND OF THE INVENTION

The present invention relates to video camera processing and, more particularly, to preventing aliasing in video camera signals.

A known digital video camera is shown in FIG. 29 and generates video camera signals which are subject to aliasing. Aliasing is that phenomenon which occurs when an analog signal is digitally sampled at an insufficient sampling rate. The lowest sampling rate which produces a sampled signal that can be reconverted to the original analog signal is known as the Nyquist frequency or rate. The resulting aliased signal is a lower frequency version, or "alias", of the original signal. Aliasing is particularly a problem when a non-linear function, such as a gamma correction function (FIG. 2A), is applied to the video signal because the correction function adds high frequency harmonics to the input video signal. These high frequency harmonics require a higher sampling rate than anticipated and, therefore, produce alias signals.

The digital video camera of FIG. 29 is affected by aliasing because it includes a gamma correction circuit 134 as part of its video camera signal processing. An optical system 100 provides a focussed image which is converted into a video signal by a charge coupled pickup or sensing device 110 (CCD). The video signal is, then, pre-amplified by a pre-amplifier 111 and video amplified by a video amplifier 112. The video amplified signal is digitized by an analog-to-digital converter 113 and forwarded to a defect correction circuit 114 for digital correction. The corrected video signal is delayed by a first delay circuit 115 and, then, further delayed by a second delay circuit 116. The twice delayed video signal is applied to a linear matrix 132 for correcting a color reproduction error, which arises because the photographing performance of the CCD in reality is different from an ideal photographing performance. After being combined with an image contour signal by an adder 130, the linearized video signal is applied to a series of correction circuits, which includes a knee correction circuit 133, the problematic gamma correction circuit 134 and a B/W clip circuit 135. The gamma correction circuit 134 applies a non-linear function to the video signal which gives rise to the aliasing problem.

The gamma correction circuit of 134 receives digital samples of the video signal at a sampling rate $f_s$ and converts each received digital sample into a value which best fits the gamma correction function shown in FIG. 30. That is, the gamma corrected signal is not ideal and results in a collection of values which are approximations of the ideal. When this occurs, unwanted frequency harmonics are produced by the gamma correction function. Where the frequency of the input video signal is high, the sampling rate $f_s$ may not be sufficient to accurately represent the input signal. Thus, sampling occurs at a lower rate than the Nyquist rate and aliasing occurs.

The aliasing problem is graphically illustrated by FIGS. 31A-31D which show the harmonics in the frequency domain. Aliasing occurs when the harmonics overlap with complement harmonics as shown in FIG. 31B. An ideal sinusoidal wave has a single harmonic f and, therefore, yields a sinusoidal wave at the output of an ideal gamma correction circuit represented by the frequency component at frequency f shown in FIG. 31A. However, the usual gamma correction circuit is not ideal and produces the harmonics shown in FIG. 31B which are produced at frequencies according to the asymptotic function of sampling theorem. The original signal can be reconstructed only so long as the frequency f is low and the harmonics do not substantially overlap with the harmonics of the complement signal at f', as shown in FIG. 31C. However, aliasing occurs when the frequency f of the video signal is high and shifts closer to its complement frequency f'. In this situation, as shown in FIG. 31D, the harmonics overlap and are combined and, therefore, the resulting digital signal yields an aliased analog signal which cannot be reconstructed into the original video signal (FIG. 31D).

Harmonics also arise when image contour processing is applied to the video signal. For example, in the video camera of FIG. 29, an image contour is emphasized by processing the video signal in the horizontal and vertical directions after the video signal has been delayed by delay circuits 115, 116 and 117. A vertical direction high pass filter (HPF) 121 and a horizontal direction low pass filter (LPF) 122 function to pass the vertical direction component of the image contour signal to a multiplier 123. Similarly, a vertical direction LPF 124 and a horizontal direction HPF 125 pass the horizontal direction component of the image contour signal to a multiplier 127. The vertical and horizontal contour signals are multiplied by respective gain adjustment signals applied to respective terminals 144 and 145 to emphasize the contours in the multipliers 123, 127, respectively. The emphasized vertical and horizontal contour signals are combined by an adder 128 to form the emphasized image contour signal which is fed to a limiter 129 for limiting the output of the adder 128 such that the resultant limited signal is not overly emphasized.

The image contour processing also generates high frequency components which give rise to the aliasing problem. More specifically, when the gamma correction circuit 134 digitally samples the contour signals contained in the output of adder 130 and which contains high frequency components, aliasing occurs and the original contour signal cannot be reconstructed.

Although the problem of aliasing which arises from contour image processing would be avoided if the contour image signal is combined with the video signal after gamma correction, another problem arises because the gamma correction function serves to amplify the video signal. Therefore, if the contour image signal is combined with the video signal after gamma correction, the contour image signal is relatively small as compared with the amplified video signal. As a result, the contour of an image is not adequately represented in the displayed video picture. Thus, it is not a sufficient solution to combine the image contour signal with the gamma corrected video signal after gamma correction.

The problem of aliasing will be further explained with reference to FIG. 32 which schematically depicts a simplified configuration of the video camera shown in FIG. 29, and in which a video signal is received at input terminal 160 and digitized by an analog-to-digital converter 161 to produce the digitized video signal $(a_s)$ of FIG. 33. The digitized video signal $(a_s)$ is output to a high pass filter 162 (corresponding to the contour image processing circuitry) and to a low pass filter 164 (corresponding to the linear matrix 132). The image contour processed signal $(b_s)$ of FIG. 34 is combined with the linearized video signal $(c_s)$ of FIG. 35 by an adder 168 to yield the video signal with emphasized contours ($d_s$) of FIG. 36. The emphasized video signal ($d_s$) is fed to a gamma correction circuit 167 which produces the gamma corrected signal ($e_s$) of FIG. 37 at an output terminal 169.

It will be noted from FIG. 33 that the signal ($a_s$) includes several frequency harmonics which are filtered by the high pass filter 162, resulting in the image contour signal ($b_s$) shown in FIG. 34 having the low frequency components removed. Conversely, the low pass filter 164, representing the linear matrix 132 (FIG. 29), filters out high frequency components and results in the linearized signal ($c_s$) of FIG. 35 having its high frequency components removed. The combined signal ($d_s$) shown in FIG. 36 is the sum of the image contour signal ($b_s$) and the linearized signal ($c_s$). At this point, it will be noticed that the combined signal ($d_s$) includes several frequency components which is indicative of the frequency modulated nature of this signal. Thus, when the combined signal ($d_s$) is applied to the non-linear gamma correction circuit 167, the gamma corrected signal ($e_s$) is distorted as shown in FIG. 37 due to the aliasing problem. As shown in FIGS. 39-42, the same distortion occurs when a burst signal in FIG. 38 is input as the video signal. The burst signals at each node shown by FIGS. 39-42 are distorted in a manner similar to the signals in FIGS. 34-37, respectively. The resulting gamma corrected burst signal ($e_B$) of FIG. 42, therefore, suffers from the same distortion due to the aliasing problem as does the gamma corrected video signal shown in FIG. 37.

OBJECTS AND SUMMARY OF THE INVENTION

Therefore, it is an object of the present invention to provide a video camera which avoids the undesirable effects of aliasing.

Another object of the present invention is to provide a video camera or the like which can avoid aliasing due to non-linear processing, especially gamma correction processing, and carry out contour highlighting irrespective of the level of the main line video signal.

A further object of the invention is to provide a method for processing a digital video signal in a video camera so as to provide gamma correction or other signal modifications in accordance with non-linear functions while avoiding aliasing.

In accordance with an aspect of this invention, a video camera is provided with a signal modifying circuit for modifying an amplitude level of a digital video signal according to a non-linear curve that represents a desired modified digital video signal as a function of the digital video signal, such circuit comprising:

means for dividing said non-linear curve into a plurality of sections and replacing each of said sections with a respective straight-line segment which can be expressed as a linear expression to form a succession of straight-line segments;

low pass filter means to which the digital video signal is supplied to produce a filtered digital video signal in which high frequency signals of the digital video signal capable of causing aliasing are attenuated;

means for generating a multiplying coefficient and an adding coefficient of a linear expression of one of said straight-line segments corresponding to an amplitude level of the filtered digital video signal;

means for multiplying an amplitude level of the digital video signal by the multiplying coefficient to produce a multiplied digital video signal; and means for combining said multiplied digital video signal and said adding coefficient to generate said modified digital video signal.

In accordance with another aspect of this invention, a video camera having means for generating a digital video signal is further provided with:

means for generating a modified digital video signal by modifying an amplitude level of said digital video signal according to an approximated curve obtained by dividing a non-linear curve, that represents said modified digital video signal as a function of said digital video signal, into a plurality of sections and replacing each of said sections with a respective straight-line segment to form a succession of straight-line segments;

means for generating an image enhancing signal from said digital video signal;

means for generating an inclination coefficient of a respective one of said line segments corresponding to an amplitude level of said digital video signal;

means for generating s modified image enhancing signal whose amplitude level is proportional to said inclination coefficient; and means for combining said modified image enhancing signal and said modified digital video signal so as to produce an image enhanced modified digital video signal.

In accordance with a further aspect of this invention, a method of processing a digital video signal in a video camera comprises the steps of correcting high frequency components of said digital video signal by applying a linear correction function to said high frequency components within a frequency range affected by aliasing; and correcting low frequency components of said digital video signal by applying a non-linear correction function to said low frequency components of said digital video signal outside said frequency range affected by aliasing.

BRIEF DESCRIPTION OF THE DRAWINGS

The above, and other objects, features, and advantages of the present invention will become apparent from the following detailed description of illustrative embodiments which is to be considered in connection with the accompanying drawings, in which:

FIGS. 26A and 26B respectively demonstrate an attenuation equal to or more than $f_s/2$ being sufficiently carried out and not carried out, respectively;

FIGS. 27A and 27B respectively demonstrate the harmonic and folding components occurring when attenuation which is equal to or more than $f_s/2$ is sufficiently carried out;

DETAILED DESCRIPTION OF THE PREFERRED EMBODIMENTS

Figure 1:
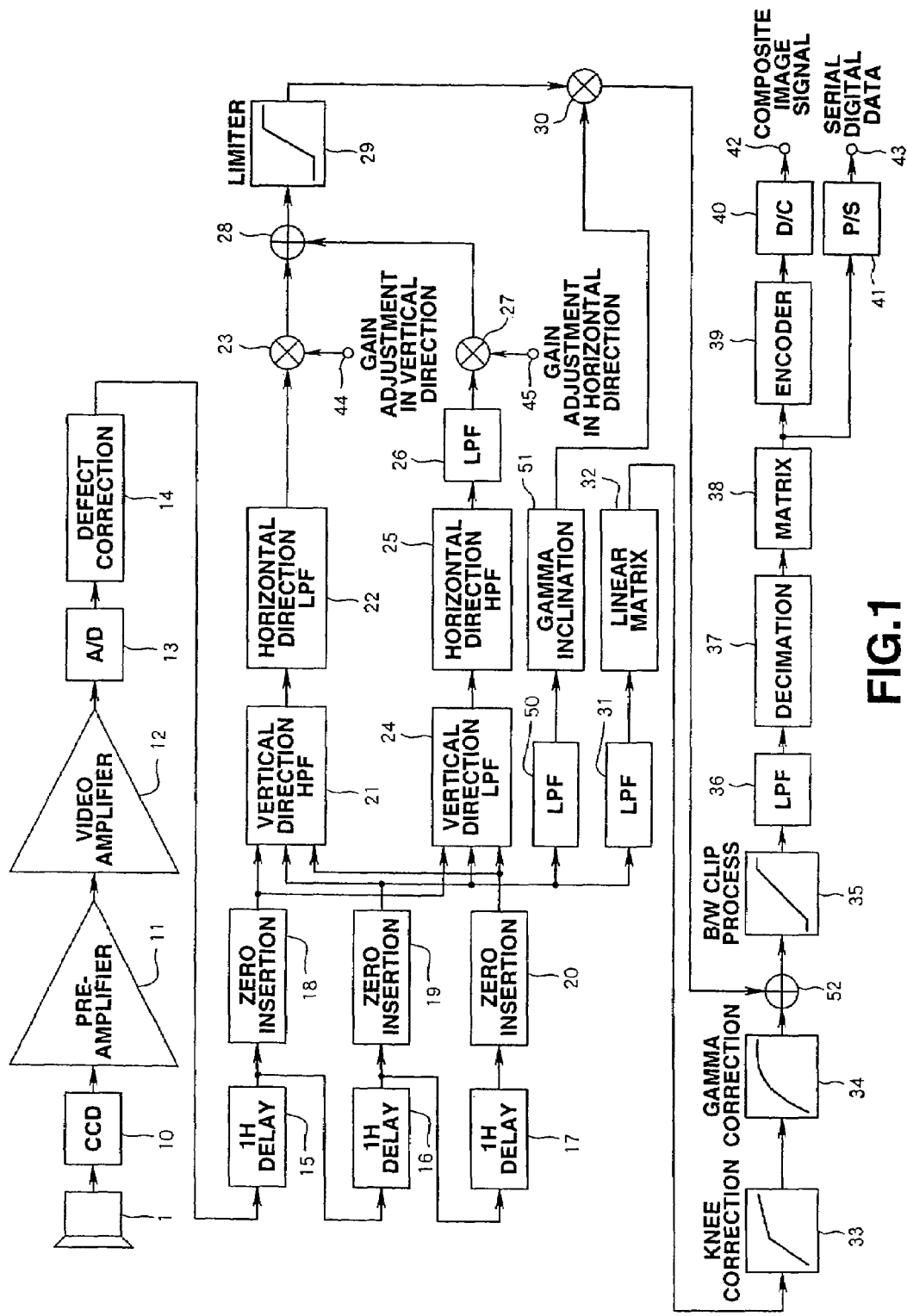
FIG. 1 is a block diagram of a digital signal processing camera according to an embodiment of the present invention.

Referring now to the drawings, wherein like reference numerals designate identical or corresponding parts throughout the several views, it will be seen that an embodiment of the invention is shown on FIG. 1 applied to a digital signal processing video camera in which light from a subject is input through an optical system 1, and focussed thereby on a CCD image pickup device 10. The CCD pickup device 10 is composed of three CCD image sensors corresponding to respective R (red), G (green) and B (blue) channels that is, the three optical primary colors. Further, these three CDD image sensors are arranged such that each pixel constituting a pixel of one of the three primary colors (in this case, for example, a G pixel) is spaced (optically) by ½ pixel pitch from each of the remaining two pixels (a R pixel and a B pixel). Furthermore, each of the CCD image sensors may have 500,000 pixels, and be operated at a horizontal driving frequency of 18 MHz.

An image signal comprised of the three channels R, G and B from the CCD image sensor 10 is supplied through a preamplifier 11 to a video amplifying circuit 12 in which black/white balance adjustment, black/white shading distortion correction, flare correction and the like are effected and also the signal amplification is carried out. An output signal from the video amplifying circuit 12 is converted into a digital video signal by an analog-to-digital (A/D) converter 13 and sent to a defect correction circuit 14 in which defects, for example, due to defective pixels of the CCD image sensor 10 are suitably corrected.

After the defect correction, the digital video signal is sent to a contour highlight signal generating circuit for carrying out contour highlight processing in horizontal and vertical directions, that is, for generating a contour highlight signal which is a high frequency signal for correcting an image contour so as to increase resolution. The contour highlight signal generating circuit is composed of 1H delay circuits 15, 16 and 17, a digital high pass filter (HPF) 21 for the vertical direction, a digital low pass filter (LPF) 22 for the horizontal direction, a digital low pass filter (LPF) 24 for the vertical direction, a digital high pass filter (HPF) 25 for the horizontal direction, multipliers 23 and 27, an adder 28 and a limiter 29.

In the contour highlight signal generating circuit, the 1H delay circuits 15, 16 and 17 are connected to each other in series to delay the digital video signal supplied through the defect correction circuit 14 by 1H (H being a horizontal period) in sequence, and also input respectively delayed digital video data. By reason of the series connection of the delay circuits 15, 16 and 17, the digital video signals output from the delay circuits 15, 16 and 17 are respectively delayed by one, two and three lines in the vertical direction relative to the digital video signal being concurrently input to the delay circuit 15.

Figure 23A:
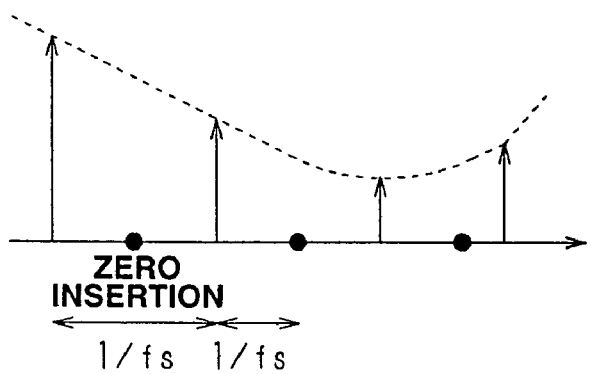
FIGS. 23A and 23B demonstrate band limitation by means of zero insertion and low pass filtering.
Figure 23B:
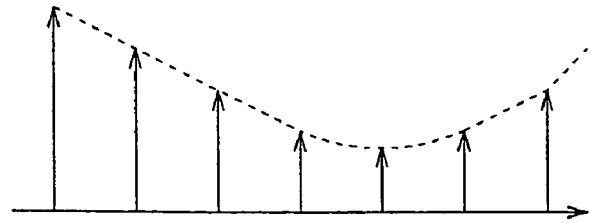
Figure 24A:
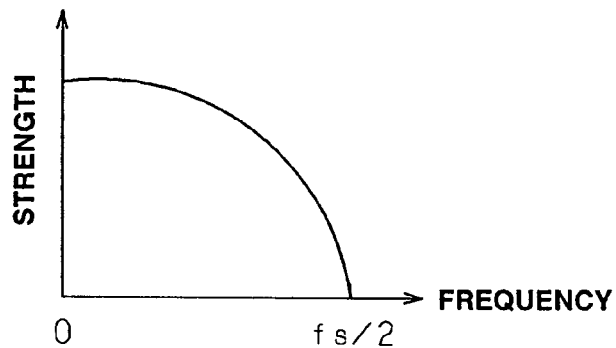
FIGS. 24A, 24B and 24C illustrate a folding component remaining after the processing of FIGS. 23A and 23B.
Figure 24B:
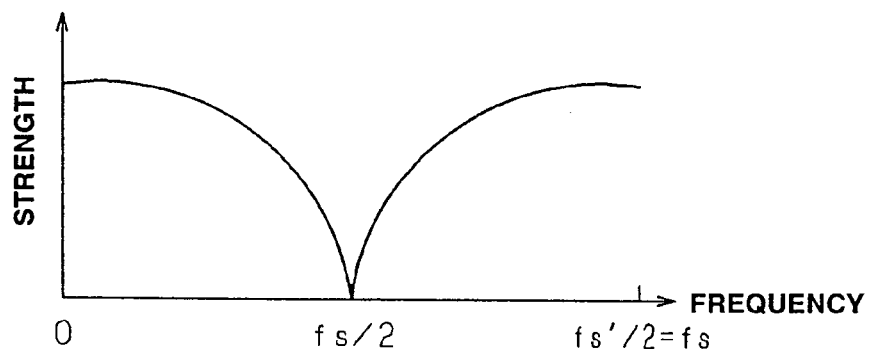
Figure 24C:
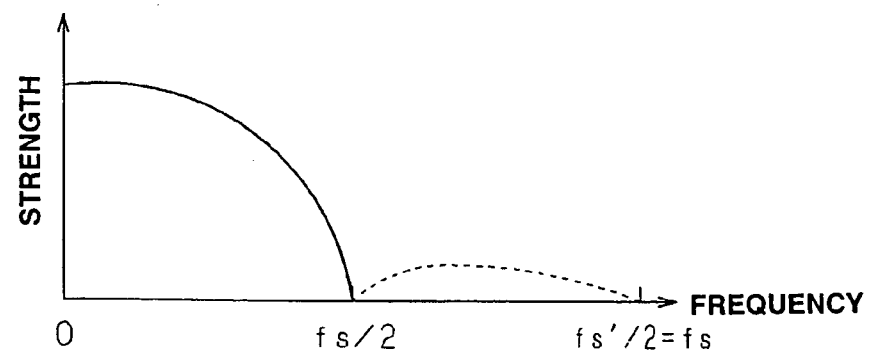

In the preferred embodiment of the invention shown in FIG. 1, the delayed signals from the circuits 15, 16 and 17 are output to zero insertion circuits 18, 19 and 20, respectively. The zero insertion circuits 18, 19 and 20 function to up-convert the digital frequency of the respective delayed signals by inserting zero data at points between the digital samples of the delayed signals. When zero data is inserted half-way between the successive digital samples, as shown in FIG. 23A, the effect is to double the number of samples in the digital signal, as shown in FIG. 23B, that is, the effective sampling rate of the video camera is doubled. Since aliasing occurs when the sampling rate is below the Nyquist rate, doubling the sampling rate by means of the zero insertion data technique, which will be further described below, assists in eliminating the aliasing problem. Although zero insertion circuits 18-20 are employed in the preferred embodiment of the present invention being now described, it will be appreciated that the present invention may be employed without such zero insertion circuits.

Returning to FIG. 1, it will be seen that the up-converted signals from the zero insertion circuits 18, 19 and 20 are supplied through the HPF 21 and then through the LPF 22 for extracting a vertical direction image contour component or signal from the digital video data passed through HPF 21 and LPF 22. Simultaneously, the digital video data shifted by delay circuits 15, 16 and 17, respectively, and passed through zero insertion circuits 18, 19 and 20, are further passed through the LPF 24 and then the HPF 25 for extracting a horizontal direction image contour component or signal from the digital video data.

The vertical direction image contour component or signal extracted by the HPF 21 and LPF 22 is sent to the multiplier 23, which multiples the vertical direction image contour signal by a gain adjustment value applied to a terminal 44 for emphasizing the vertical direction image contour signal. The horizontal direction image contour signal extracted by LPF 24 and HPF 25 is, in the illustrated embodiment of the invention, fed through a low pass filter (LPF) 26, whose function is hereinafter further described, to multiplier 27 for multiplication by a gain adjustment value applied to a terminal 45 so as to emphasize the horizontal direction image contour signal. The adder 28 combines the emphasized vertical and horizontal image contour signals from the multipliers 23 and 27, respectively, and supplies the resulting combined image contour signal to a limiter 29 which limits the combined signal to a normalized range. The limited combined image contour signal from limiter 28 is applied as one of the inputs to a multiplier 30.

In the illustrative embodiment of the invention, the digital video signal to which the combined image contour or highlight signal is to be added, as hereinafter described, is derived from the zero insertion circuit 19 and is also sent to a low pass filter (LPF) 31 that attenuates the high frequency components of the digital video signal on the so-called main line. The attenuated video signal is supplied from LPF 31 to a linear matrix 32 which is provided in order to correct a color reproduction error resulting from the photographing performance of the CCD image sensor 10 being different from an ideal photographing performance thereof.

Figure 2A:
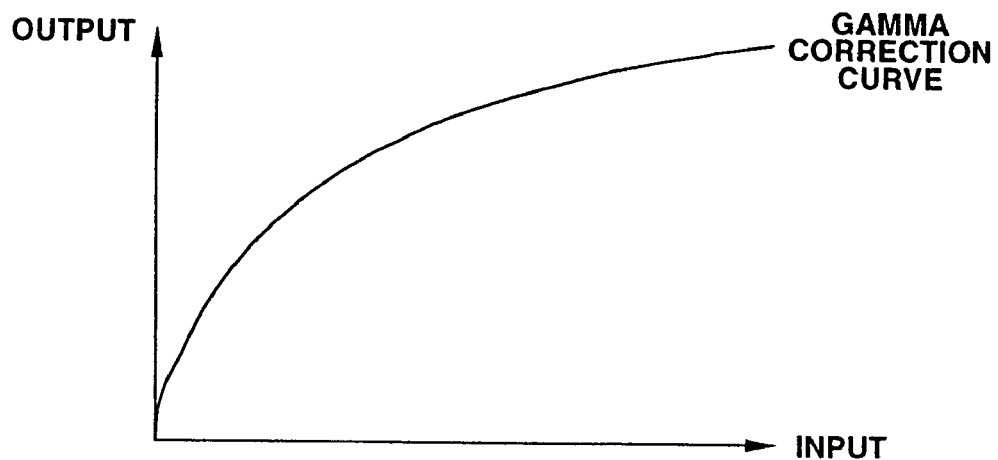
FIG. 2A is a graph showing a gamma correction curve.
Figure 2B:
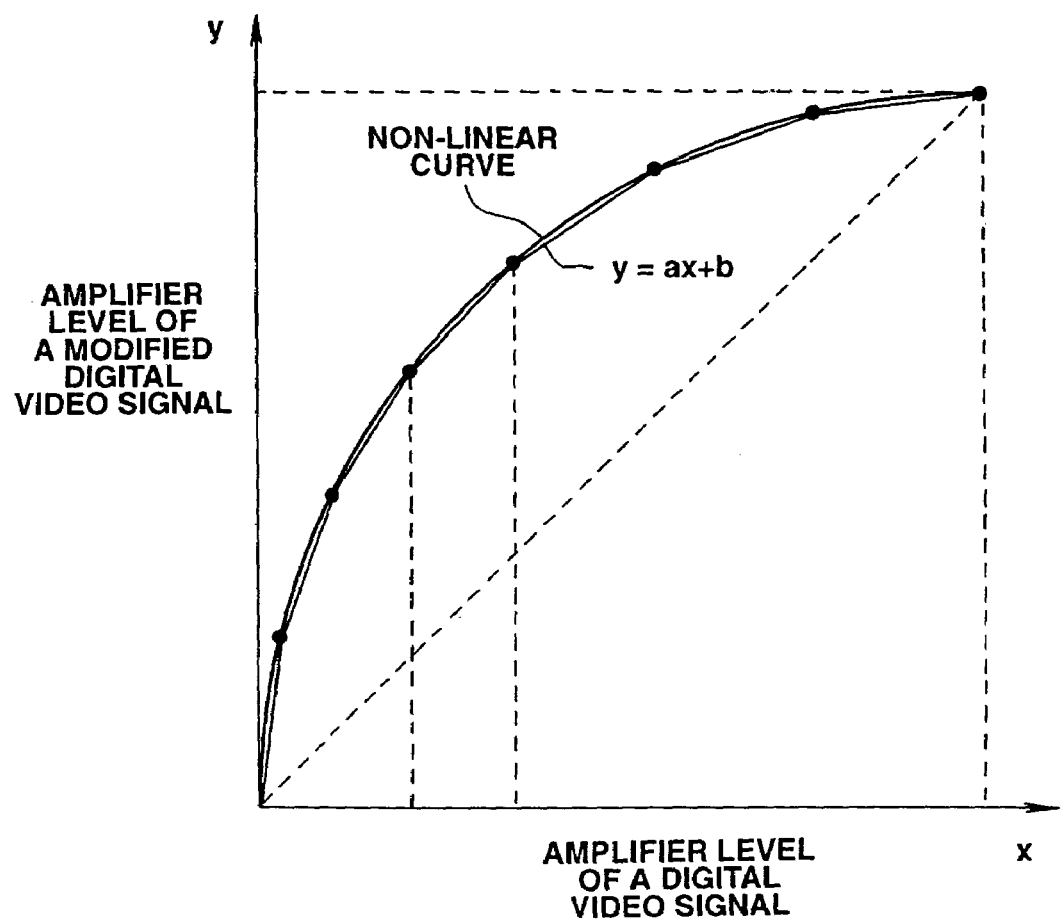
FIG. 2B is a graph showing an approximation of the gamma correction curve constituted by a succession of linear segments.
Figure 2C:
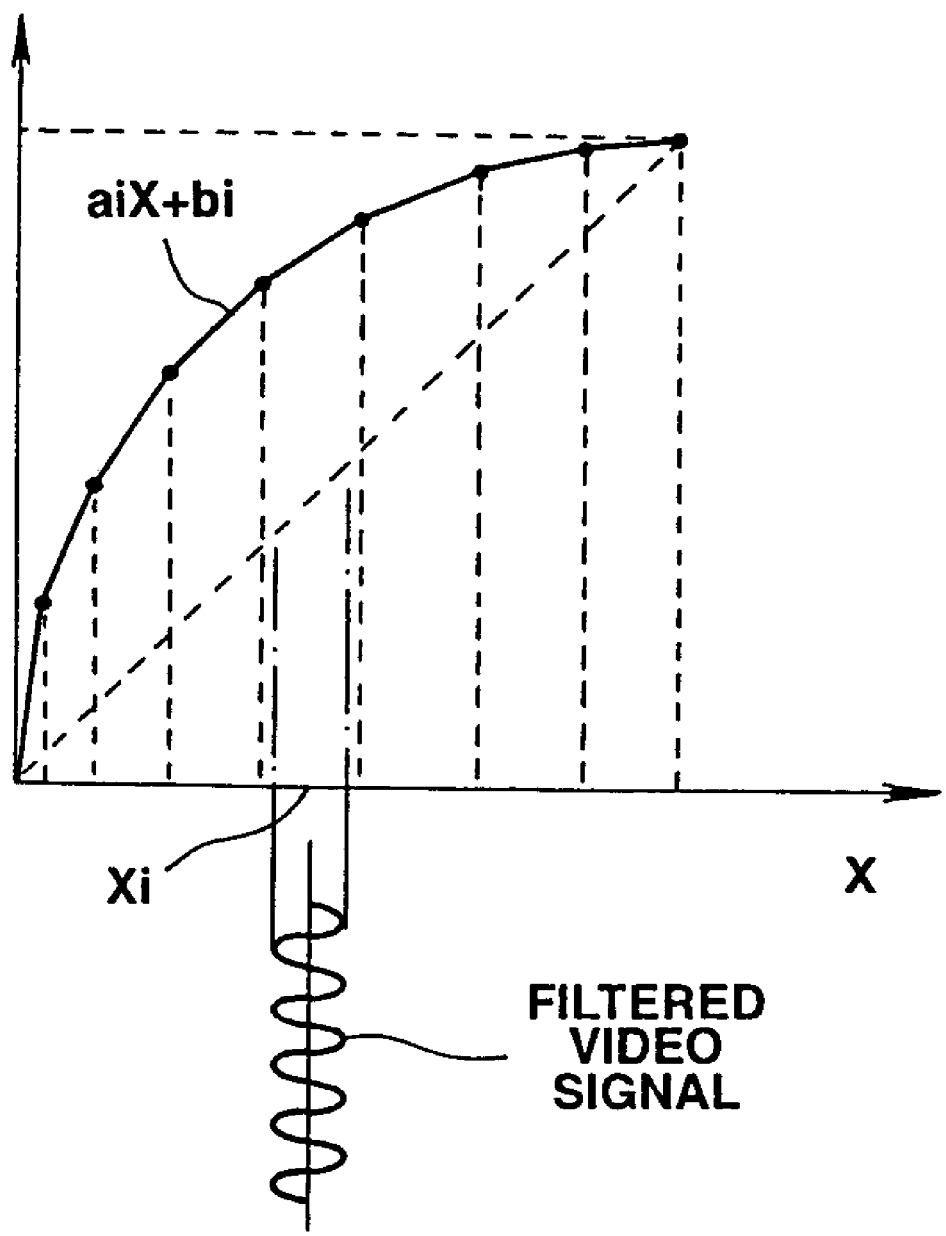
FIG. 2C is a graph showing a low pass filtered video signal applied to the gamma correction curve.

Non-linear processing of the digital video data from linear matrix 32 are affected in a knee correction circuit 33 and then in a gamma correction circuit 34 which function, for example, as a level compressing/expanding means. The high frequencies of the video signal on the main line are attenuated in the LPF 31 so as to have an amplitude that is smaller than a deviation between two successive sampling points on the gamma correction function (FIG. 2C). Since the gamma correction circuit 34 naturally applies an interpolation when the input signal falls between two sampling points on the gamma correction function, the gamma correction function may be thought of as being made up of a plurality of connecting line segments (FIG. 2B). Thus, in accordance with the present invention, the gamma correction function (FIG. 2A) is replaced by a plurality of connecting line segments which may be each expressed by equation $y=a_i(x)+b_i$ (FIG. 2B). Since the attenuated video signal falls entirely within one section of the gamma correction function, the line segment corresponding to that section may be selected and output as a pair of coefficients (a) and (b) for representing the equation $a_i(x)+b_i$.

Figure 21:
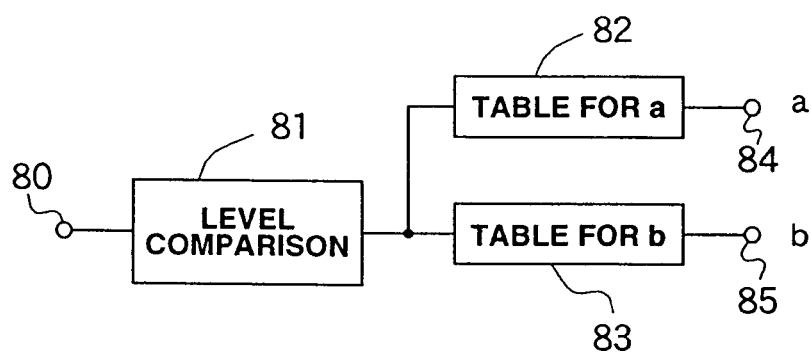
FIG. 21 is a more detailed block diagram of a coefficient generating circuit included in the gamma correction circuit of FIG. 20.

In the preferred embodiment, the coefficients (a, b) are stored in tables, herein referred to as the a-table and the b-table, and which are shown in FIG. 21 at 82 and 83 to be controlled by a level comparison circuit 81. The a-coefficient corresponds to an inclination coefficient and represents the slope of the line, while the b-coefficient corresponds to an adding coefficient and represents an offset along the ordinate. The variable (x) is dependent on the amplitude of the video signal and the coefficients (a, b) are supplied from the a and b tables 82 and 83 to arrive at a gamma corrected image contour signal.

Figure 20:
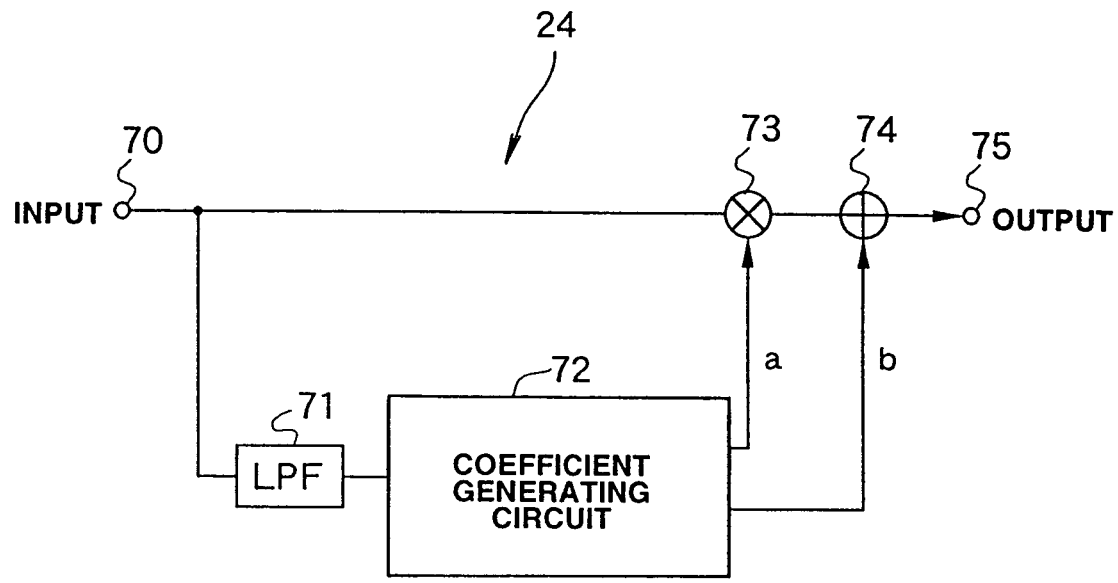
FIG. 20 is a schematic block diagram of a gamma correction circuit that may be used in the digital signal processing camera of FIG. 1.

It will be appreciated that the video signal at this point contains the main portion of the video picture with various colors. This means that the level of the attenuated video signal will vary and, therefore, come within different linear or straight-line segments of the gamma correction function depending on the particular color. In other words, the line segment chosen for the linear gamma correction of the high frequency components may be any of the straight-line segments with various slopes and DC offsets. Thus, the line segment chosen to correct the video signal will likely include both the inclination coefficient (a) and the adding coefficient (b). In the preferred embodiment, therefore, the a-table and b-table are employed for determining the co-efficients of the respective line segment as shown in FIGS. 20 and 21 when correcting the video signal. By contrast, darker colors will fall within the line segment that intersects the origin, that is, has no adding coefficient (b), and the b-table will not be utilized.

In this manner, the high frequencies of the video signal are gamma corrected by a linear function. The low frequencies, on the other hand, are not attenuated by the low pass filter 31, but are gamma corrected according to the non-linear gamma function (FIG. 2A).

Turning now to the aliasing problem arising from image contour processing, a similar technique for gamma correcting the image signal will be described. It will be recalled that the conventional video camera of FIG. 29 adds the image contour signal from the limiter 129 to the video signal from the linear matrix circuit 132 by means of the adder 130, that is, before gamma correction in the circuit 134, but this results in aliasing because the image contour processing includes a wide band of frequency harmonics. Although one solution to this aliasing might be to combine the image contour signal with the video signal after the gamma correction, that results in image contour signals which lack emphasis because the image contour signal is not amplified by the gamma correction circuit.

The present invention prevents aliasing, yet adequately amplifies the image contour signal by applying gamma correction to the image contour signal before combining the image contour signal with the video signal. More specifically, as shown in FIG. 1, the image contour signal from the limiter 29 is gamma corrected in the multiplier 30 by the output of a gamma inclination circuit 51. Similar to the correction of the video signal by the gamma correction circuit 34, the gamma inclination circuit 51 applies a linear or straight-line gamma correction function to high frequencies of the image contour signal while applying a non-linear gamma correction function to low frequencies of the image contour signal. However, in this case, the image contour signal is not used to generate the straight-line segment of a gamma correction function to be used for gamma correction of the image contour signal. Instead, the video signal up-converted by the zero insertion circuit 19 is fed through a low pass filter (LPF) 50 which attenuates the higher frequencies of the digitized video signal. The low pass filtered signal is applied from the LPF 50 to the gamma inclination circuit 51 which selects a straight-line segment for high frequencies and the non-linear gamma correction function for low frequencies. The multiplier 30 then multiplies the selected line segment or the non-linear function by the image contour signal. It will be noted that the selected gamma correction function is in phase with the image contour signal because both the selected function and image contour signal are generated from the video signal. In this manner, the gamma correction of the image contour signal according to the present invention is effected before the image contour signal is combined with the gamma corrected video signal supplied from circuit 34, as in an adder 52. Thus, aliasing is prevented from arising due to gamma correction of the image contour signal and yet suitable emphasis of the image contours in the video image can be achieved.

It will be appreciated that the linear gamma correction function for correcting the image contour signal does not utilize the adding coefficient (b). The inclination coefficient (a) corresponds to a slope of a line segment of the gamma correction function (FIG. 2C), whereas the adding coefficient (b) corresponds to an offset of that line segment. Since the image contour signal represents a dark contour, that signal will fall within the line segment that intersects the origin of the non-linear gamma correction function of FIG. 2A because that region of the gamma correction function corresponds to darker colors. Since the line segment at the origin has no adding coefficient, it is not necessary to employ the b-table in image contour processing.

After the gamma corrected video signal is combined with the gamma corrected image contour signal in the adder 52, the resulting video signal is sent through a B/W clip processor 35 to a low pass filter (LPF) 36 and then through a decimation circuit 37. The decimation circuit 37 decimates the video signal, for example, as required by PAL television standards, and feeds the decimated signal to a matrix circuit 38 for matrixing the decimated signal. More, particularly in matrix circuit 38, the digital video signal having luminance (Y) and color difference components (R-Y) and B-Y) is formed from the digital video data having the above-mentioned R, G and B values. The matrixed signal is sent to both a composite signal output 42 and a serial digital data output 43. The composite video signal is generated by encoding the matrixed signal by an encoder 39 and then converting the encoded signal into an analog wave form by a digital-to-analog converter 40. The serial digital data is generated by forwarding the matrixed signal from circuit 38 to a parallel-to-serial converter 41. In this manner, the image received by the video camera is digitally processed without aliasing and output either as a composite video signal and/or as serial digital data.

It will be appreciated that the described circuit arrangement embodying the present invention is frequency sensitive. The image contour signals in the lower frequencies outside a frequency range affected by aliasing are gamma corrected with the non-linear gamma correction function (FIG. 2A). Conversely, the image contour signals in the higher frequencies are gamma corrected with the linear gamma correction function. This is in contrast to the known video camera of FIG. 29 in which the image contour signals from limiter 129 are combined in adder 130 with the video signals from matrix circuit 132 prior to gamma correction of such video signals in circuit 134, with the result that the image contour signals as well as the main line video signals are gamma corrected according to a non-linear function regardless of the frequencies.

Figure 29:
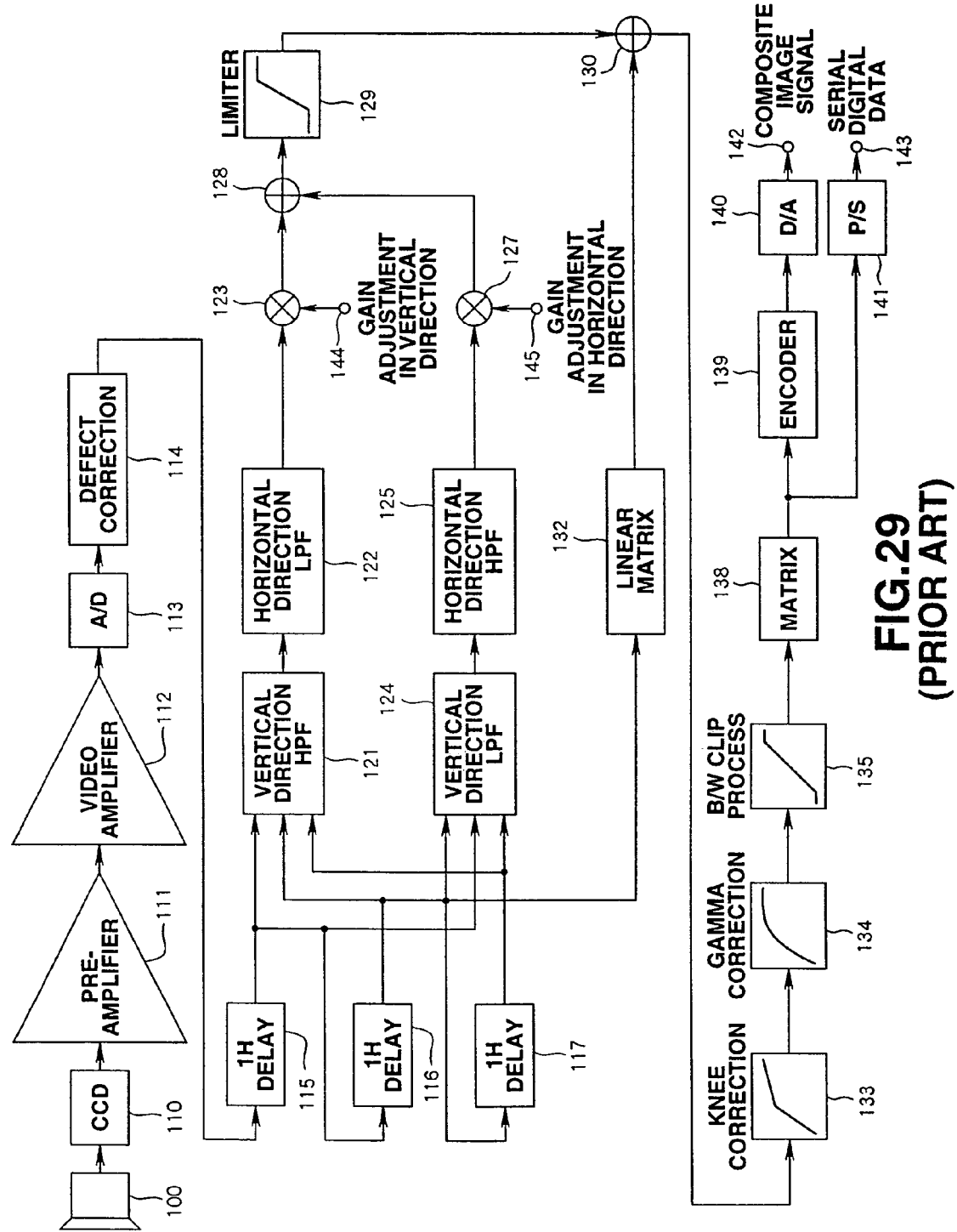
FIG. 29 is a block diagram of a conventional video camera.
Figure 30:
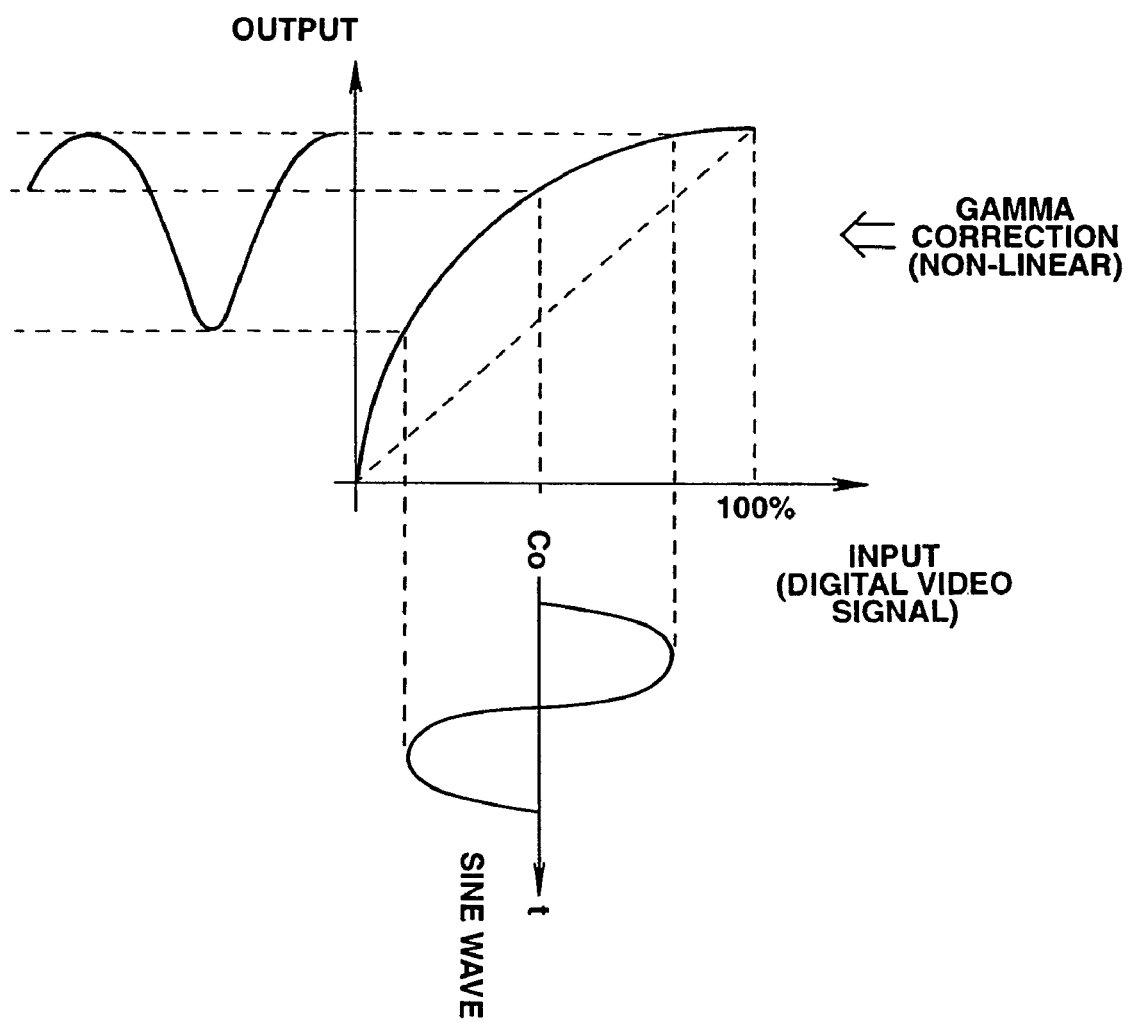
FIG. 30 is a graph illustrating the function of a gamma correction circuit included in the camera of FIG. 29.
Figure 31A:
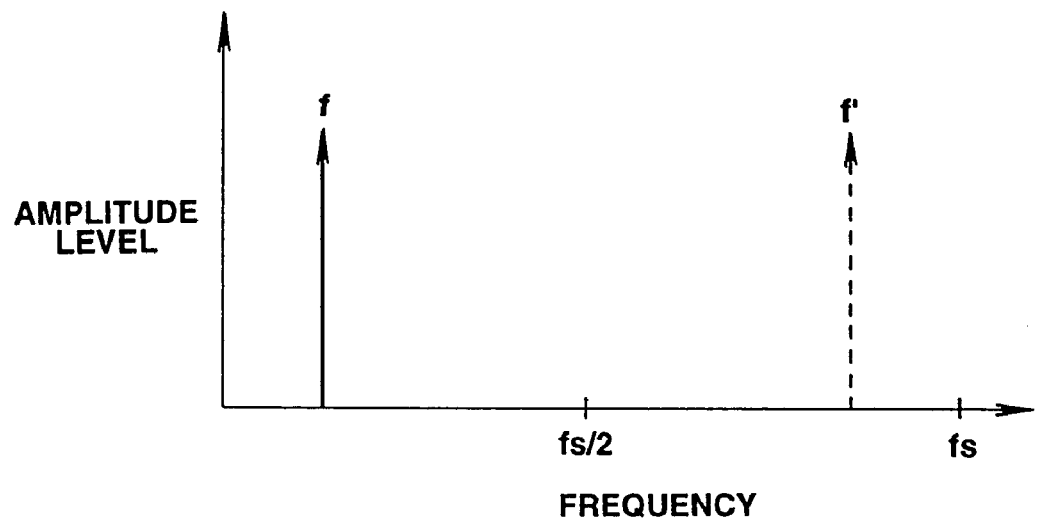
FIGS. 31A, 31B, 31C and 31D are graphs to which reference will be made in describing aliasing in the frequency domain.
Figure 31B:
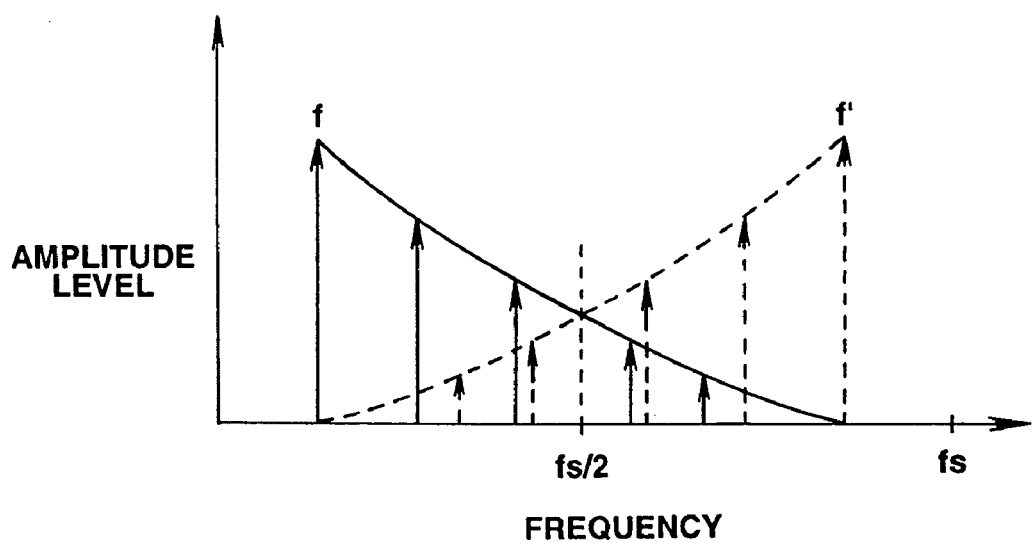
Figure 31C:
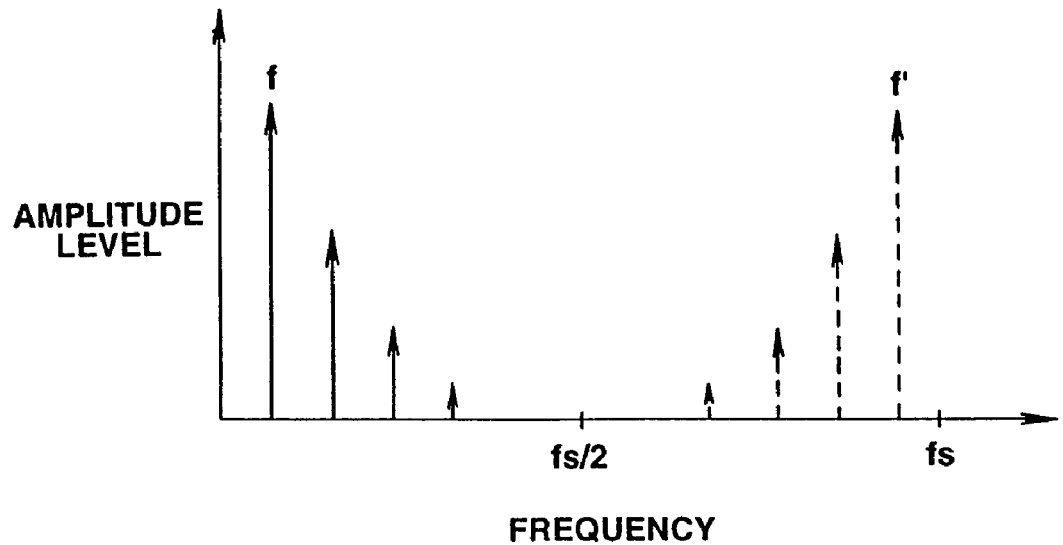
Figure 31D:
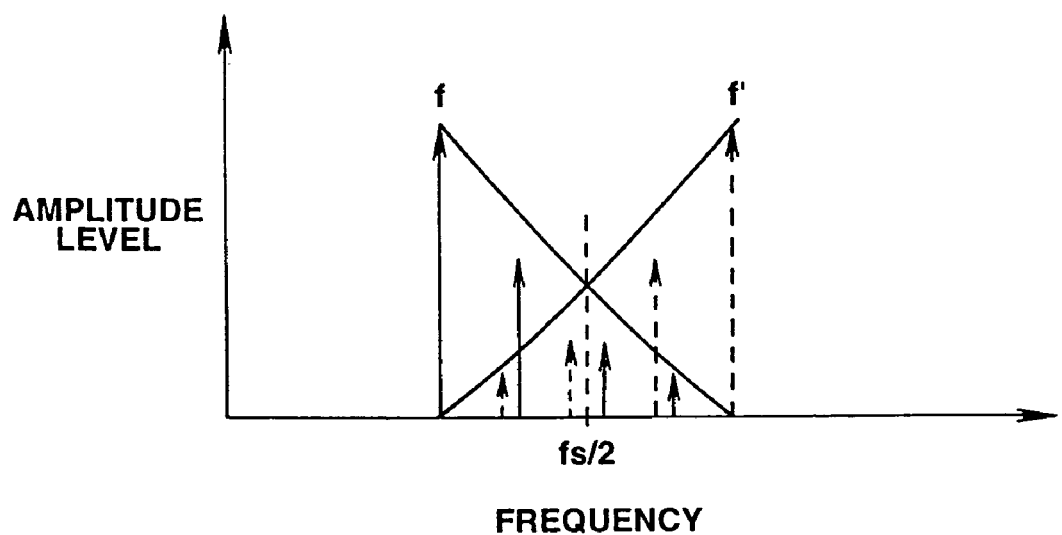
Figure 32:
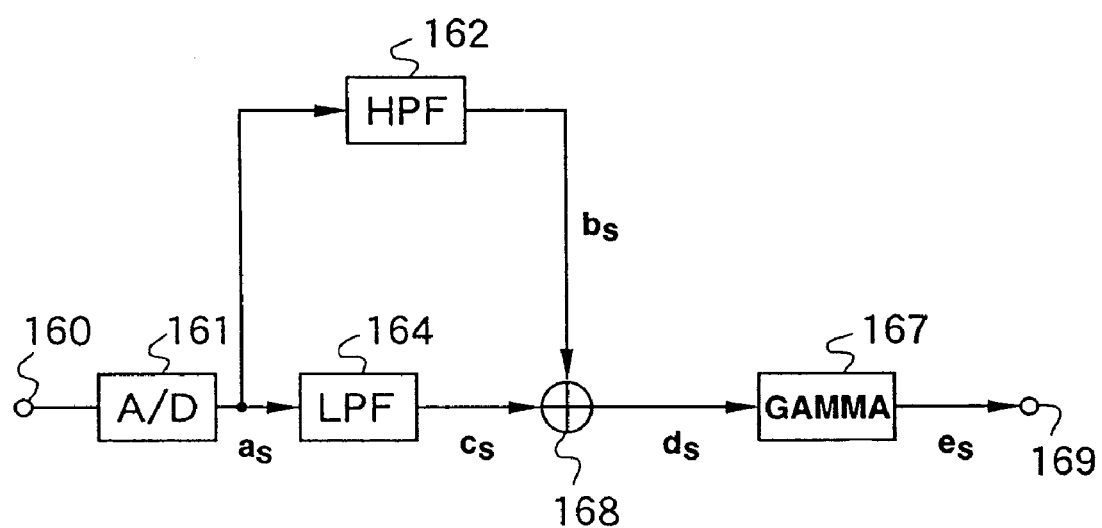
FIG. 32 is a block diagram of a simplified representation of the circuit provided in the camera shown in FIG. 29 for effecting gamma correction.
Figure 33:
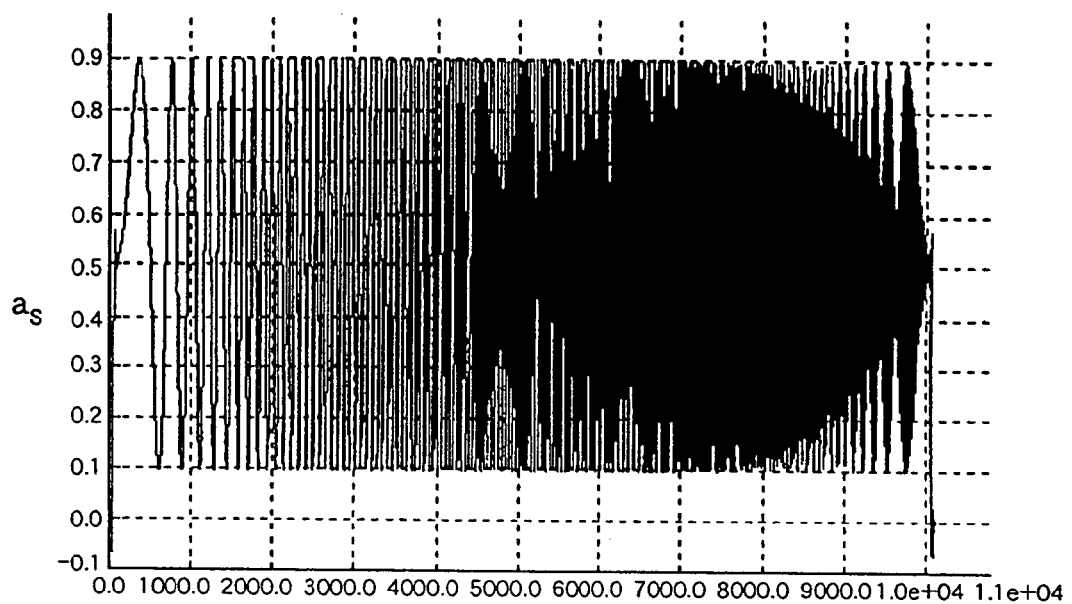
FIG. 33 is a graph of a sweep wave signal which may be the digitized video signal input to the circuit of FIG. 32.
Figure 34:
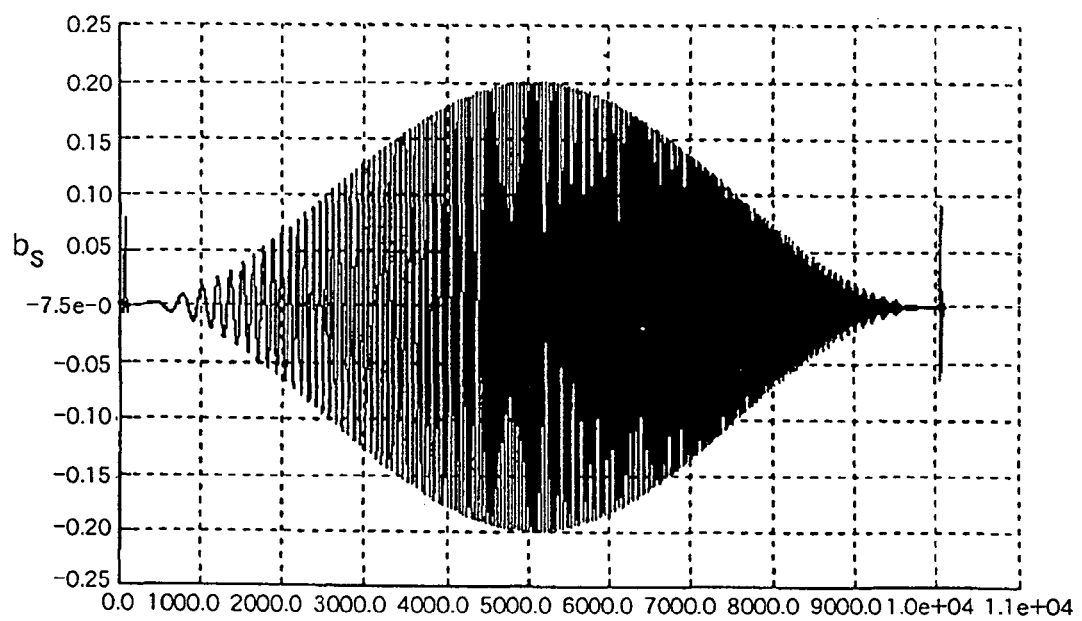
FIGS. 34-37 are graphs similar to that of FIG. 33, but showing signals at respective points in the circuit of FIG. 32, and to which reference will be made in describing the operation of that circuit.
Figure 35:
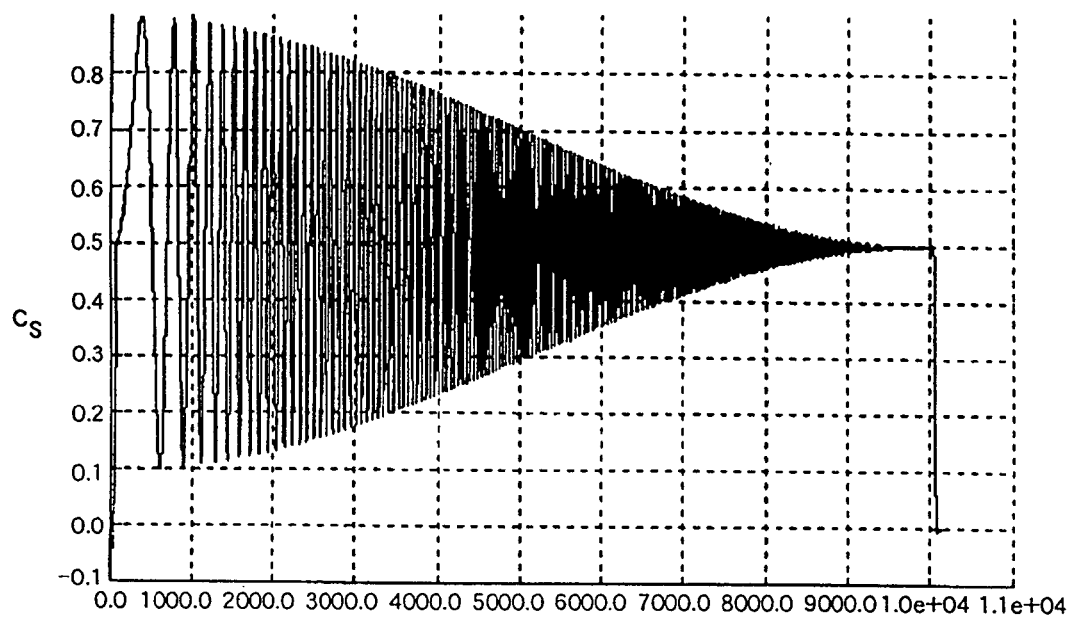
Figure 36:
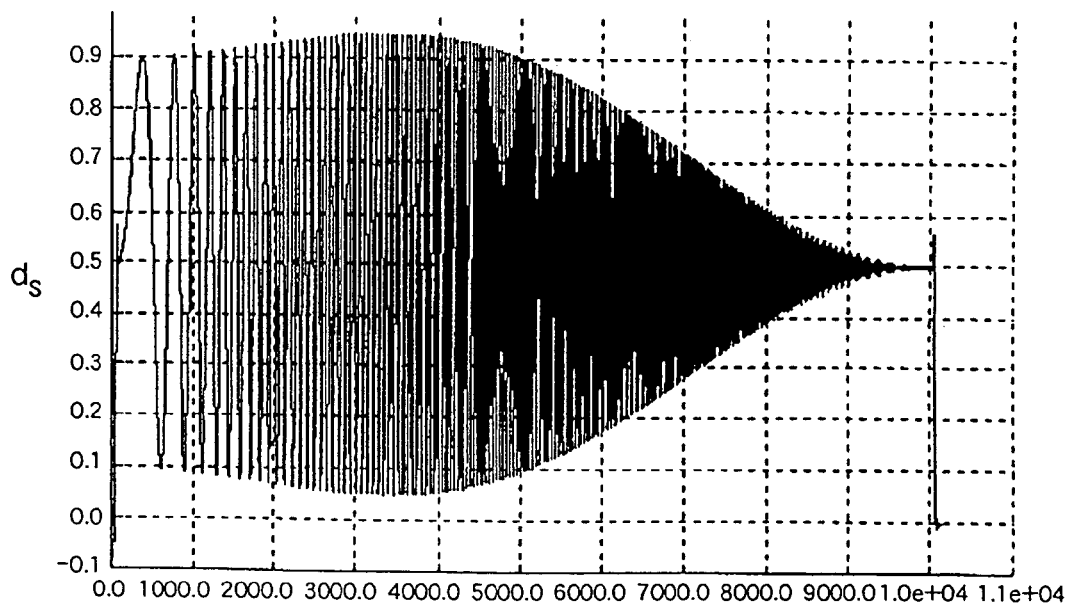

The manner in which the circuit arrangement described with reference to FIG. 1 inhibits induction of the folding components shown on FIG. 31B and mentioned as resulting from gamma correction with the known circuit of FIG. 29 will now be described with reference to FIG. 3 which schematically illustrates a simplified representation of the major circuit elements in FIG. 1.

Figure 3:
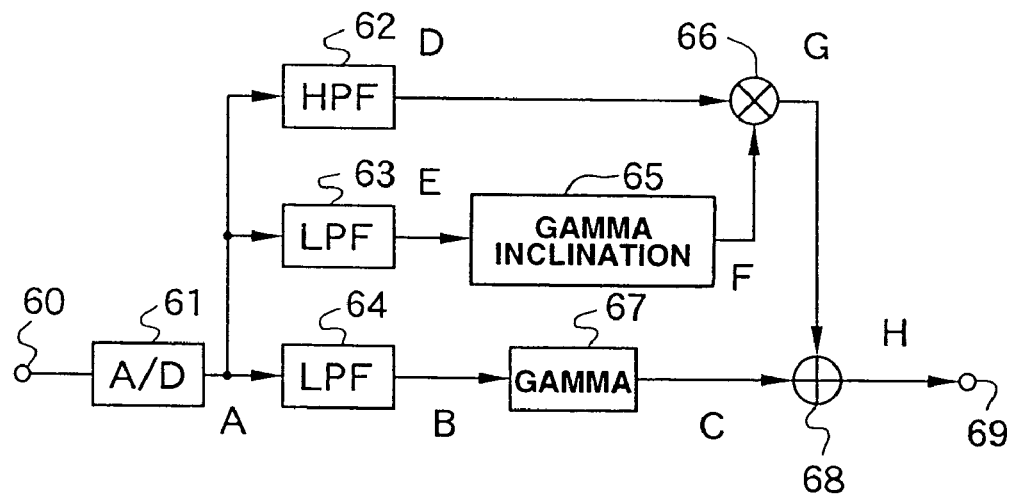
FIG. 3 is a schematic block diagram showing a simplified representation of the camera shown in FIG. 1.

More specifically, in FIG. 3, an analog video signal is supplied from a terminal 60 to an A/D converter 61 corresponding to the A/D converter 13 shown in FIG. 1. Further, in the A/D converter 61, the analog signal is sampled, for example, at a sampling frequency of fs=18 MHz, and converted into a digital signal A. This digital signal A from the A/D converter 61 is sent to a HPF 62 schematically representing the contour highlight signal generating circuit comprised of the elements 21-28 in FIG. 1, a LPF 64 schematically representing the elements 31, 32 and 33 included in the main signal line in FIG. 1, and to a LPF 63 corresponding to the LPF 50 shown in FIG. 1.

An output signal D from the HPF 62 is sent to a multiplier 66 corresponding to the multiplier 30 shown in FIG. 1. Further, an output signal B from the LPF 64 is sent to a gamma correction circuit 67 corresponding to the gamma correction circuit 34 shown in FIG. 1, and an output signal E from the LPF 63 is sent to a coefficient generating circuit 65 corresponding to the gamma inclination coefficient generating circuit 51 shown in FIG. 1. An output signal F from the gamma inclination coefficient generating circuit 65 is sent to the multiplier 66 as the multiplier for the output signal D from the HPF 62.

An output signal G from the multiplier 66 which represents the contour highlight signal (namely, the high band signal) is added in an adder 68 with the output signal C from the gamma correction circuit 67 which represents the main line signal. An output signal H from the adder 68 is applied to a terminal 69 which may be connected to the B/W clip circuit 35 shown in FIG. 1.

Figure 4:
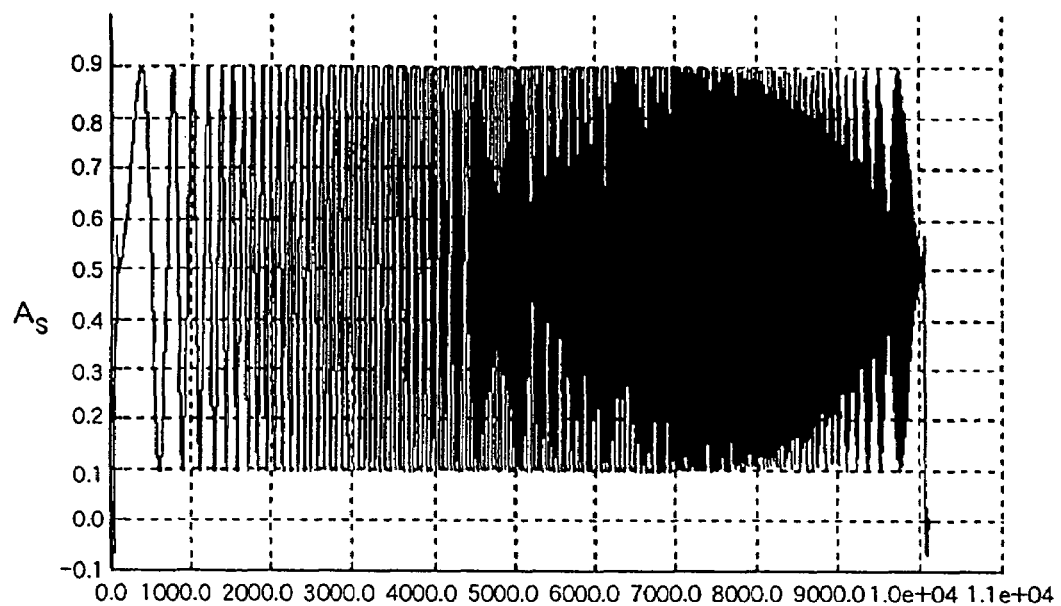
FIG. 4 is a graph of a sweep wave signal which may be the digitized input to the simplified circuit of FIG. 3.
Figure 5:
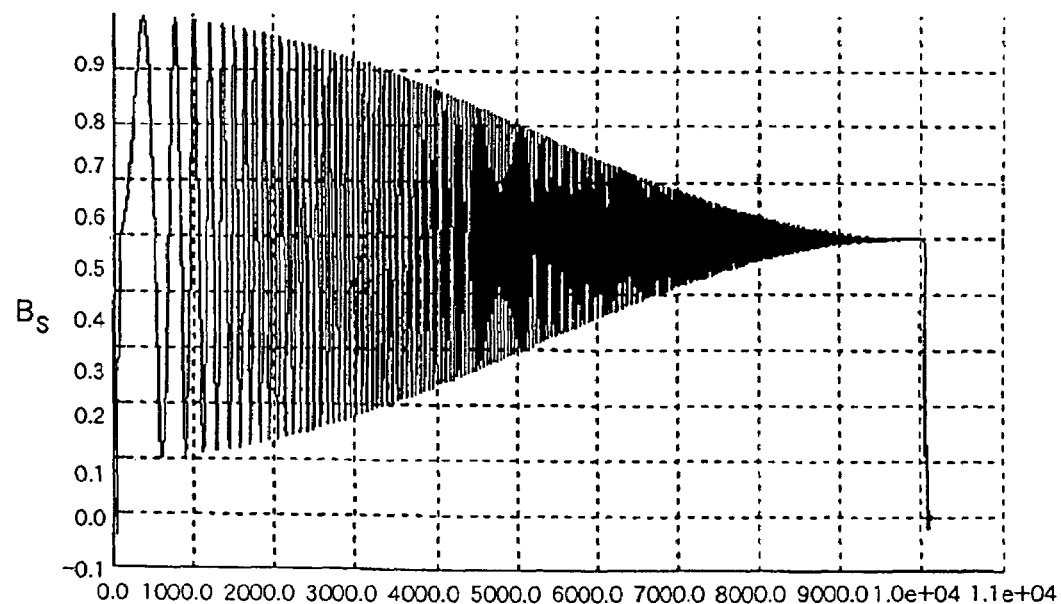
FIGS. 5-11 are graphs similar to that of FIG. 4, but showing signals at respective points in the circuit of FIG. 3 and to which reference will be made in describing the operation of that circuit.
Figure 6:
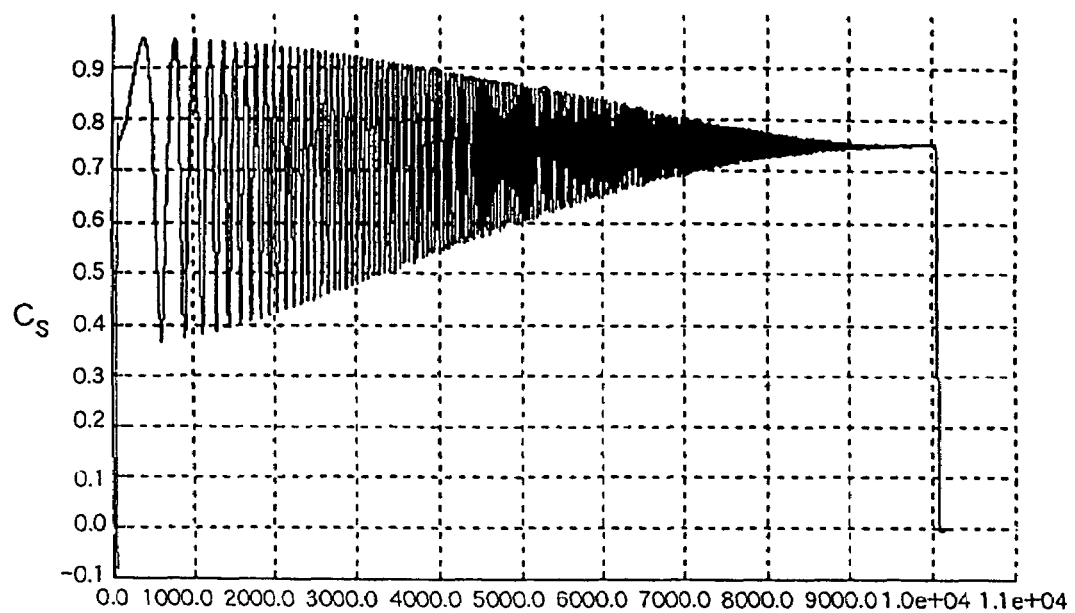

The signals at respective positions in FIG. 3 are represented as analog waves for convenience sake in FIGS. 4-19. When a video signal is input at terminal 60, the corresponding digital signal A from the A/D converter 61 having the sampling frequency of fs=18 MHz is assumed to be, for example, a sweep signal $A_s$ from 0 to 9 MHz as shown in FIG. 4. It will be noted that the signal ($A_s$) of FIG. 4 includes a wide band of frequency harmonics as representative of the frequency modulation nature of the signal. The digitized signal ($A_s$) is filtered by LPF 64, thus producing the signal ($B_s$) shown in FIG. 5. It will be noted from FIG. 5 that the higher frequency components are attenuated while the lower frequency components are passed. The low pass filtered signal ($B_s$) is gamma corrected by gamma correction circuit 67, which applies a linear function to the high frequencies and a non-linear function to the low frequencies of the video signal as described above. The resulting gamma corrected signal ($C_s$) shown in FIG. 6 is sent to adder 68.

Figure 7:
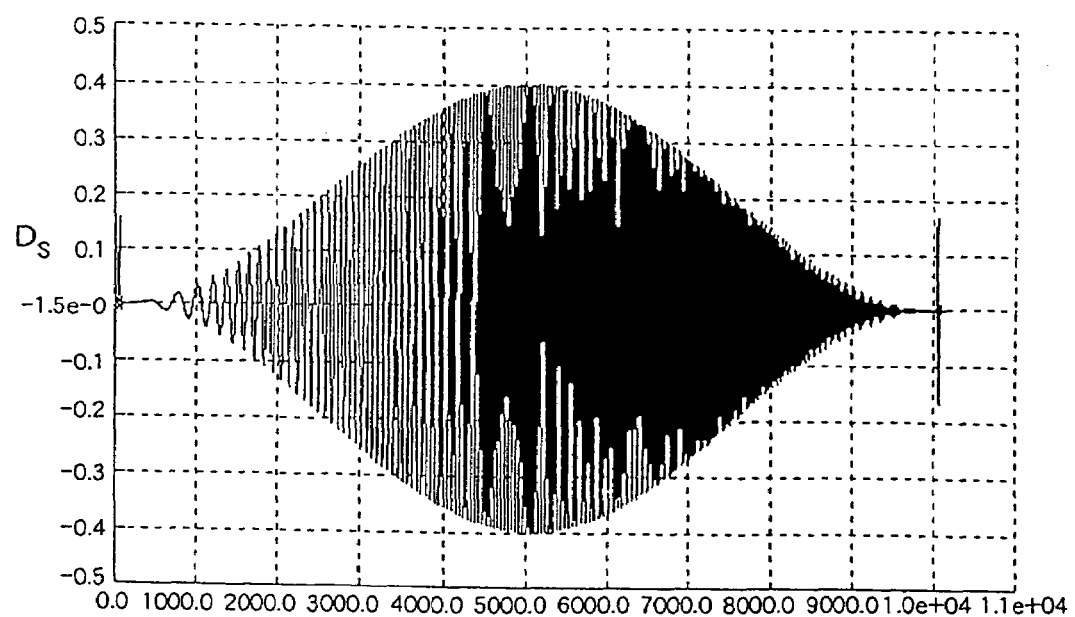
Figure 8:
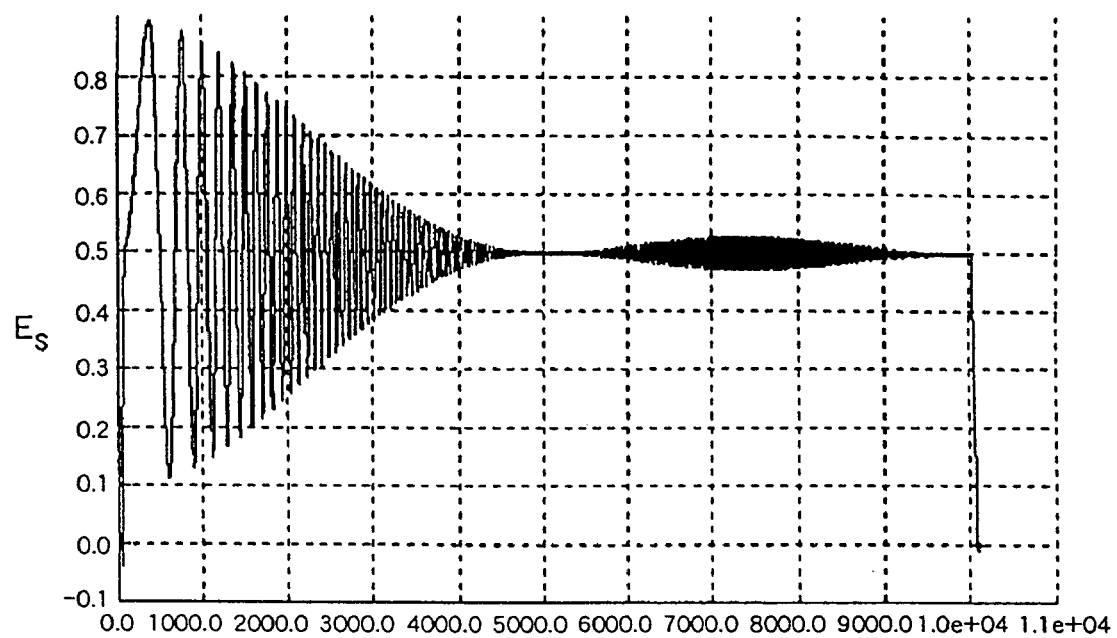
Figure 9:
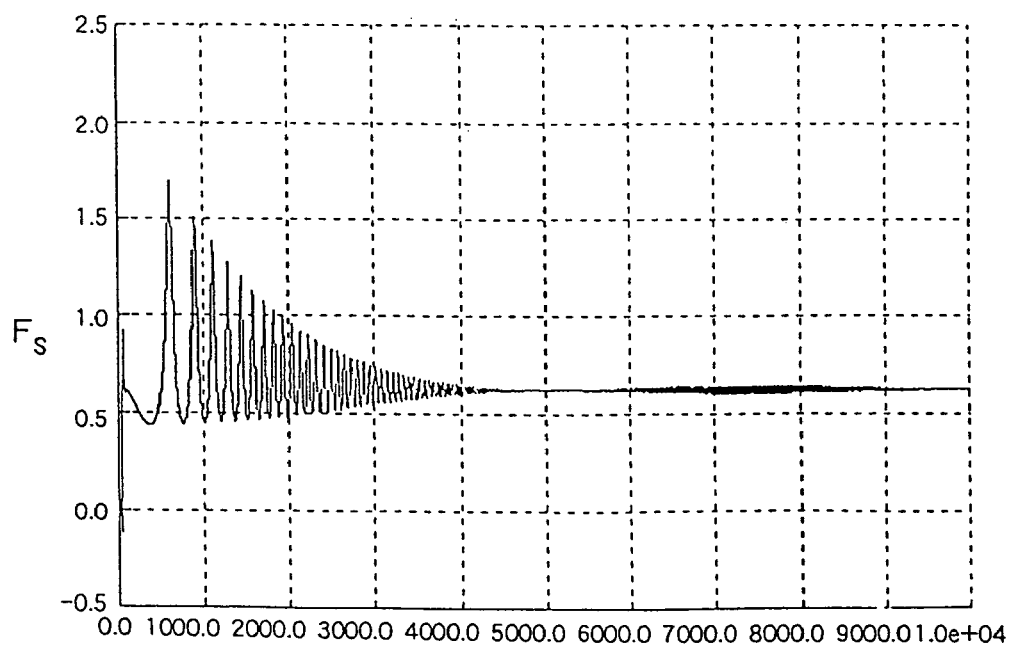
Figure 10:
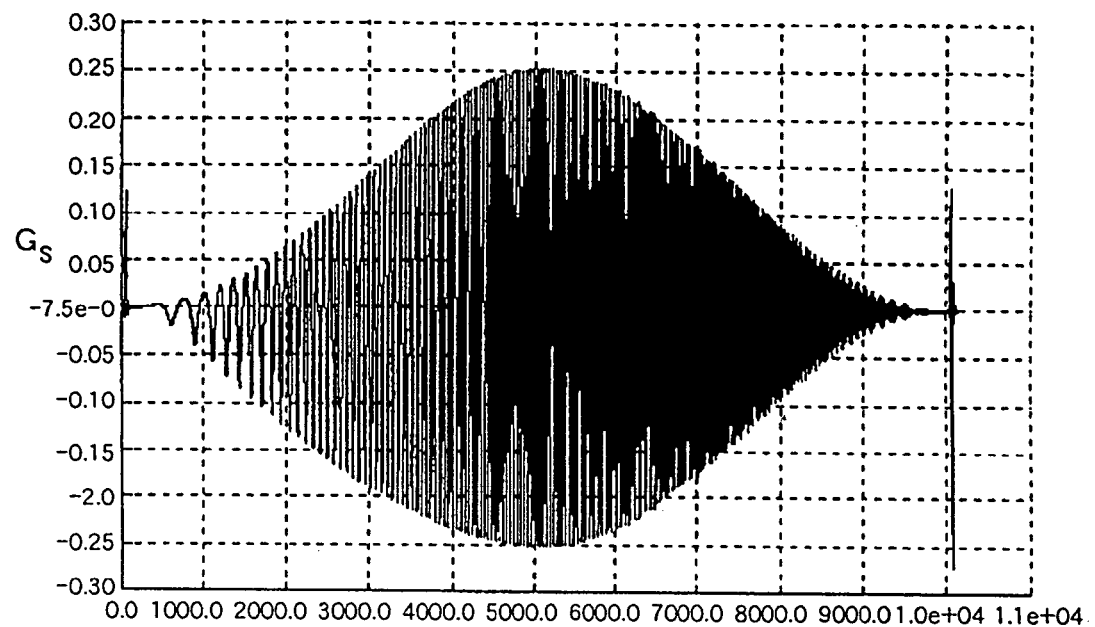
Figure 11:
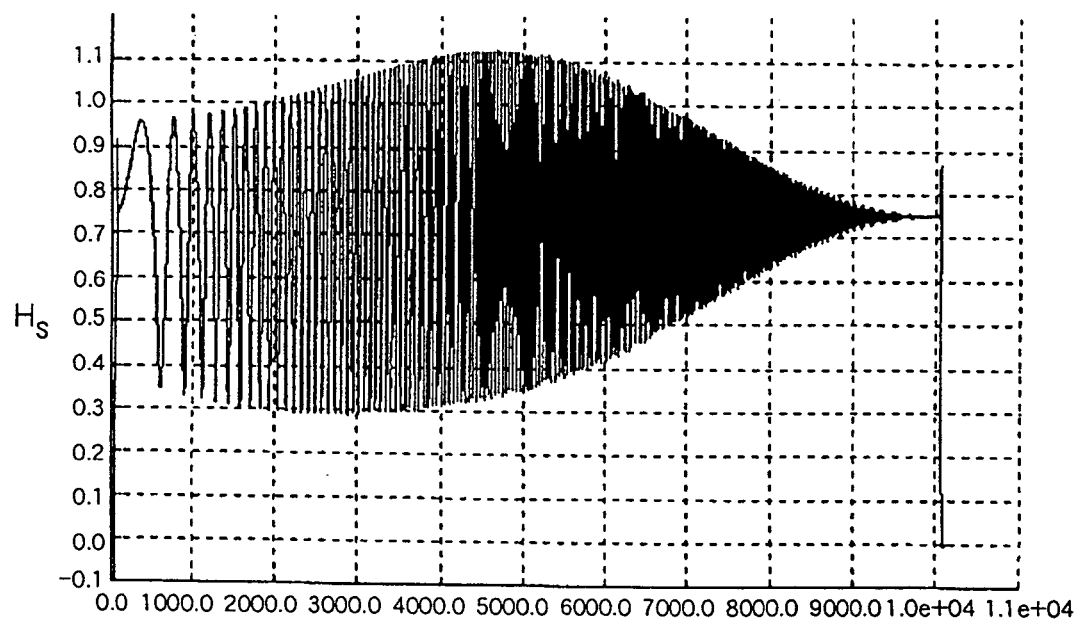
Figure 12:
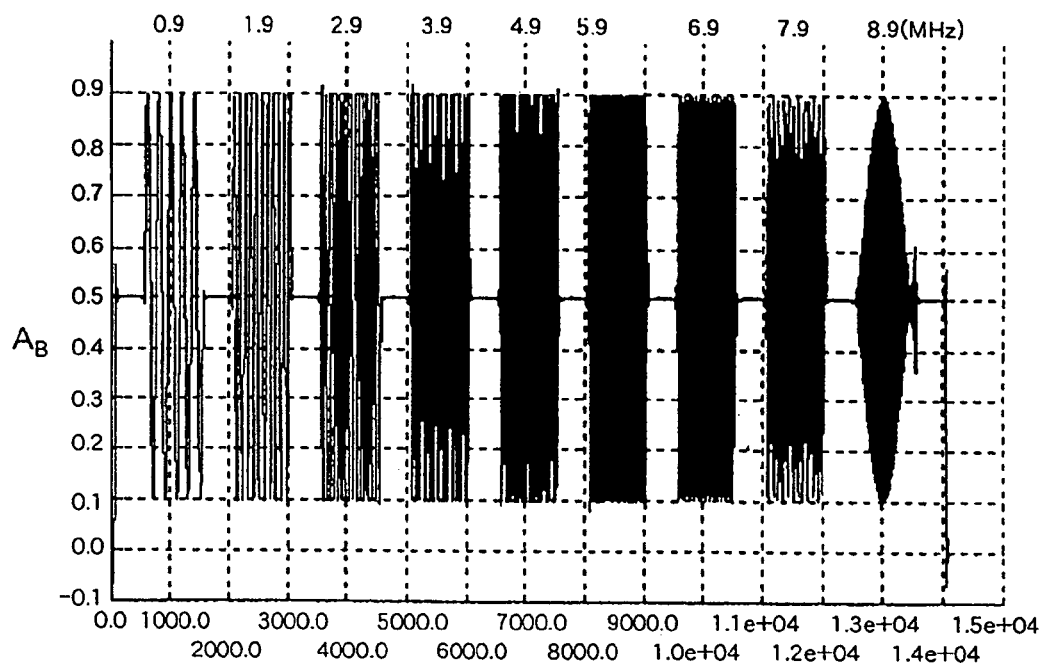
FIG. 12 is a graph of a burst wave video signal which may be the digitized video signal input to the circuit of FIG. 3.
Figure 13:
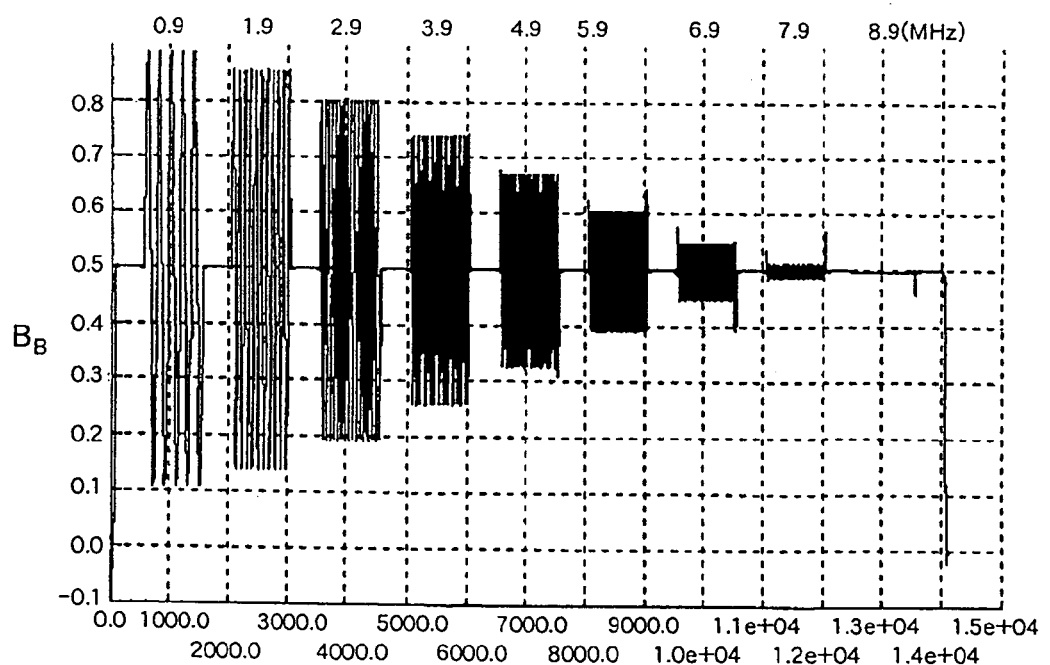
FIGS. 13-19 are graphs similar to those of FIGS. 5-11, respectively, but showing the signals at respective points in the circuit of FIG. 3 when the burst wave video signal of FIG. 12 is input thereto.
Figure 14:
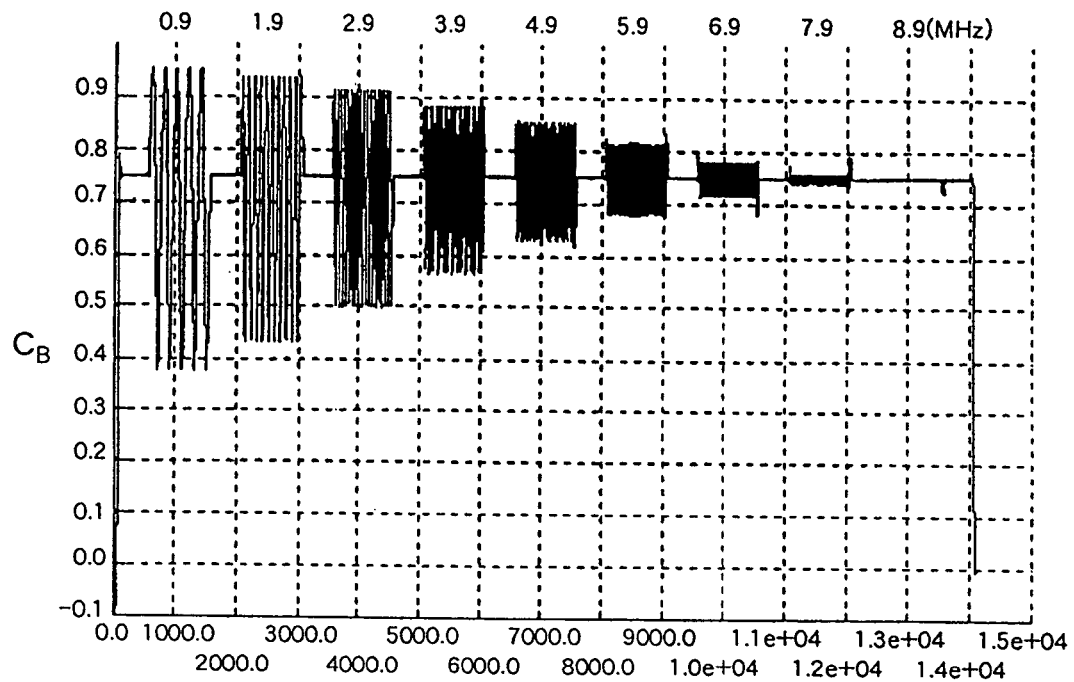
Figure 15:
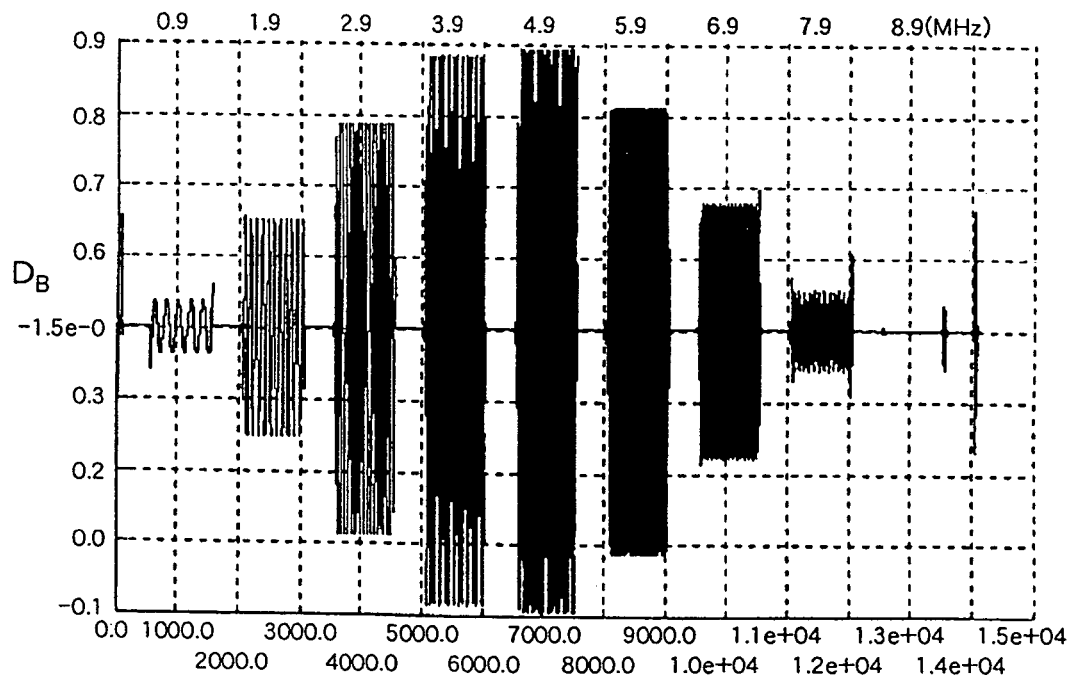
Figure 16:
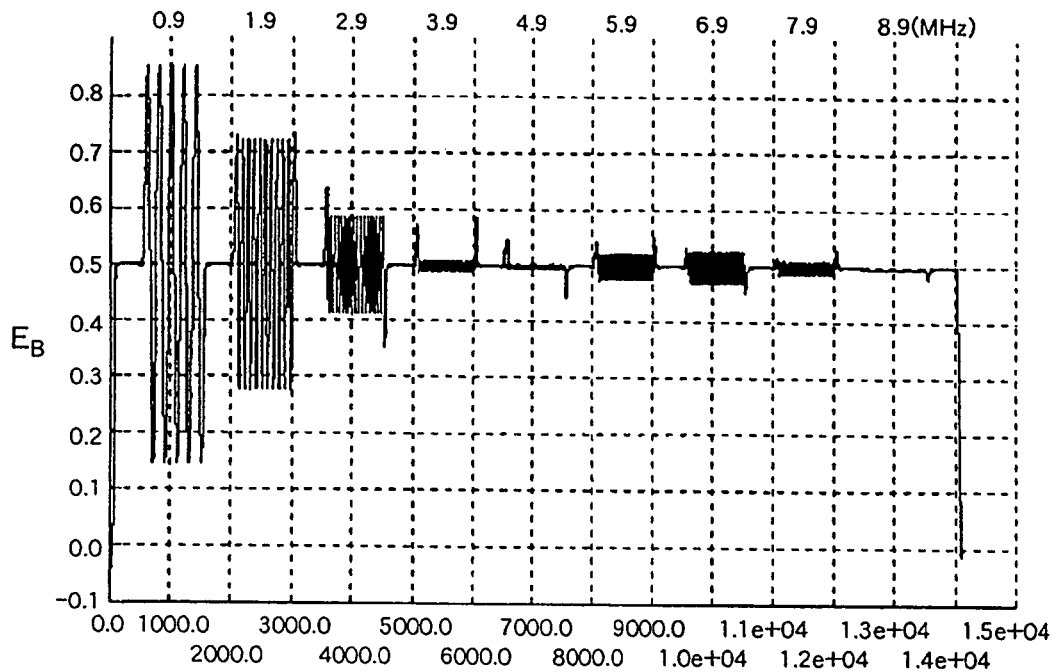
Figure 17:
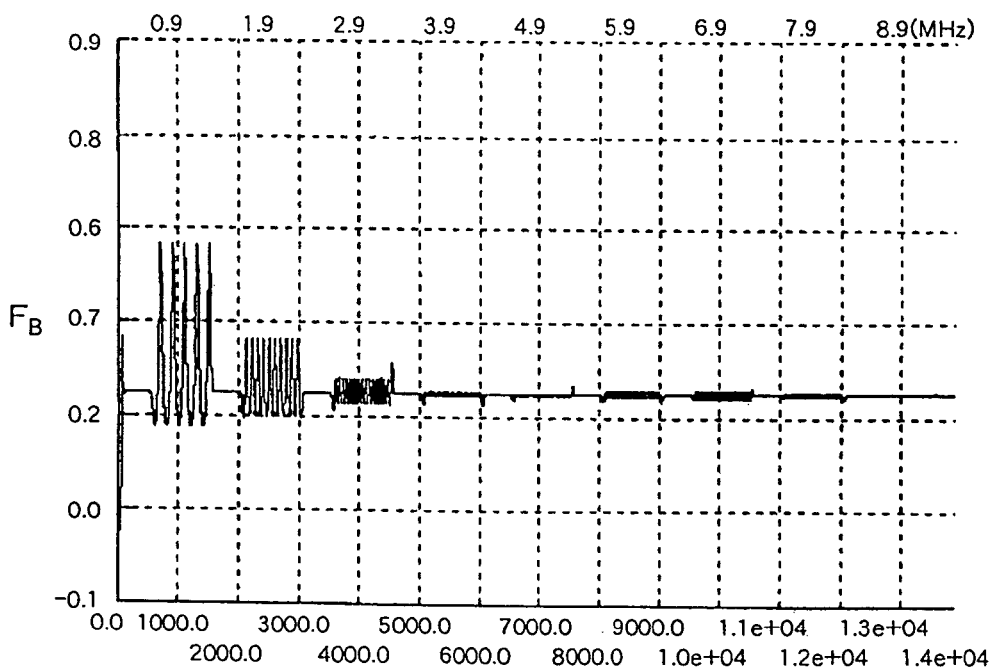
Figure 18:
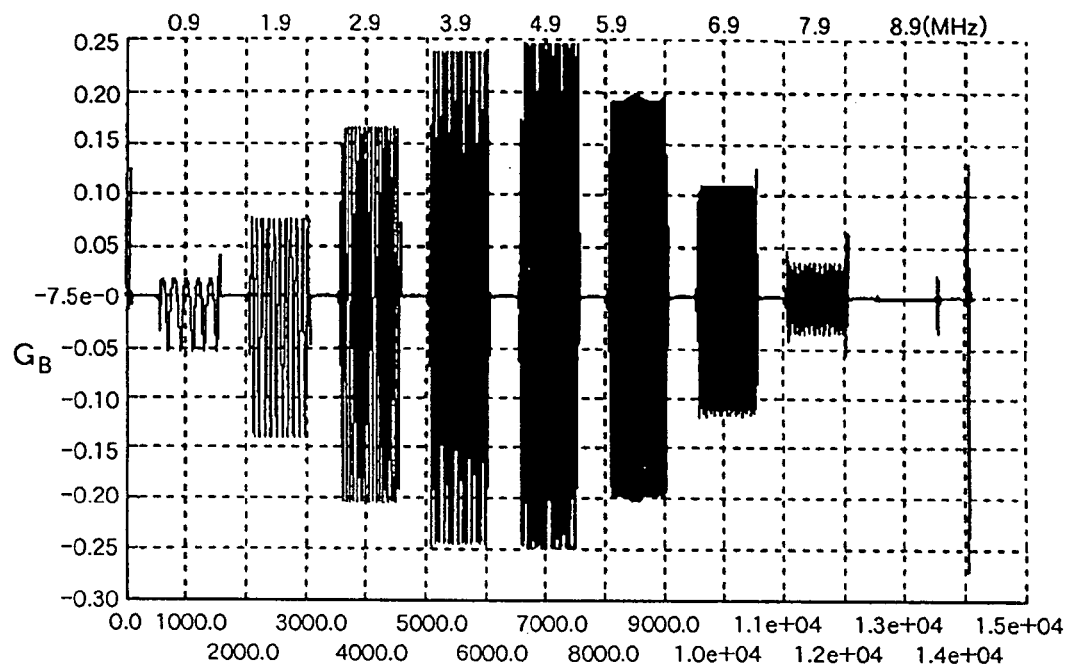
Figure 37:
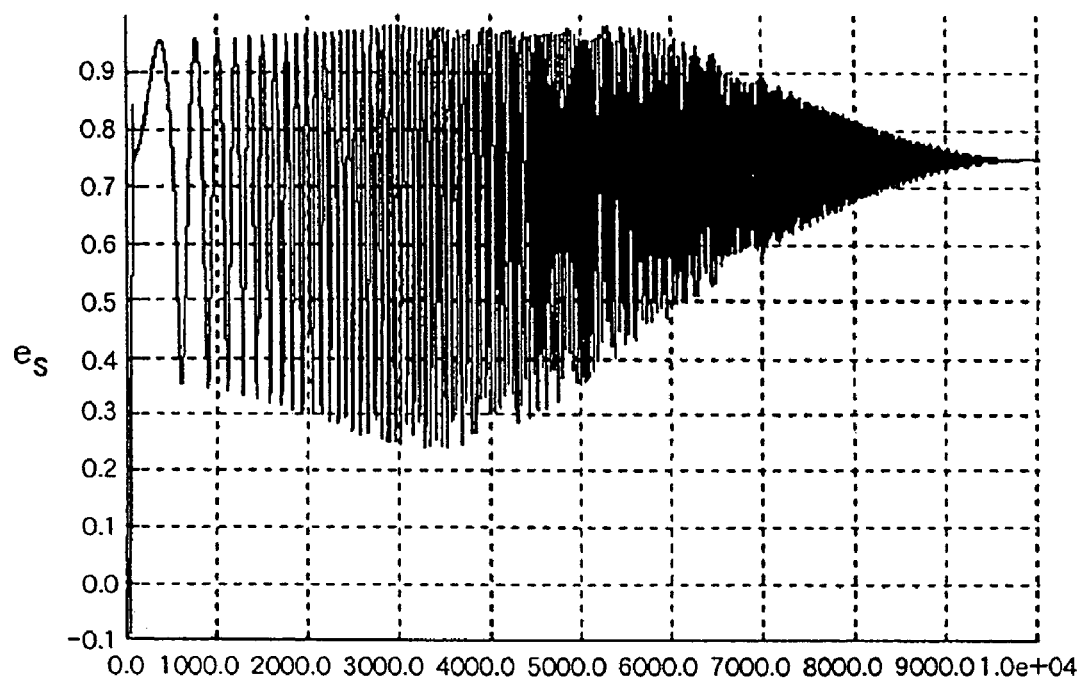
Figure 38:
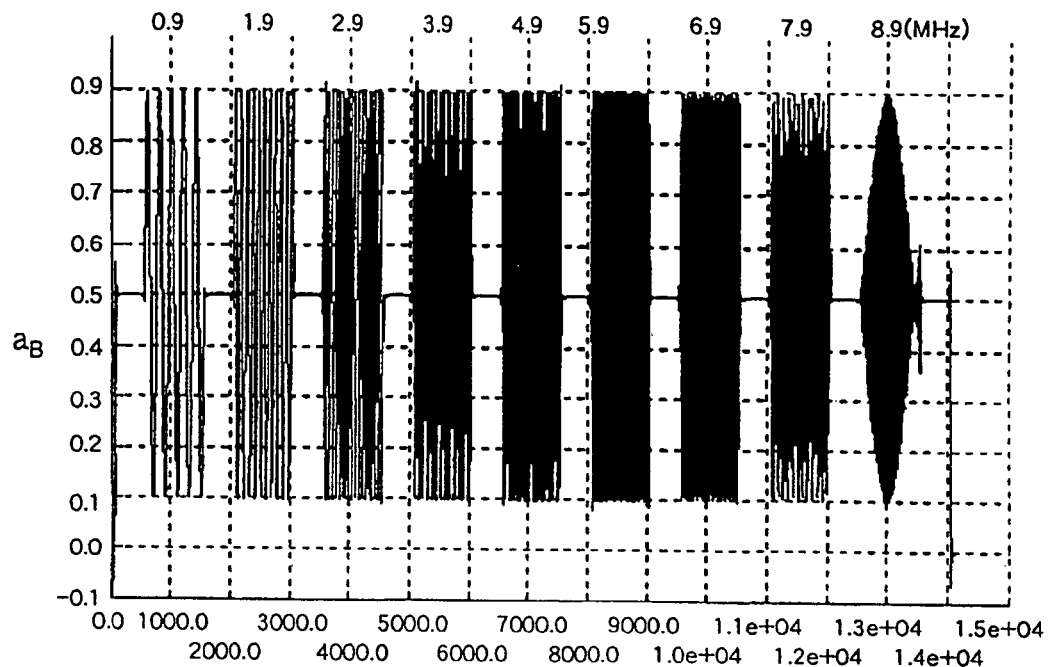
FIG. 38 is a graph of a burst wave video signal which may be the digitized video signal input to the circuit of FIG. 32.
Figure 39:
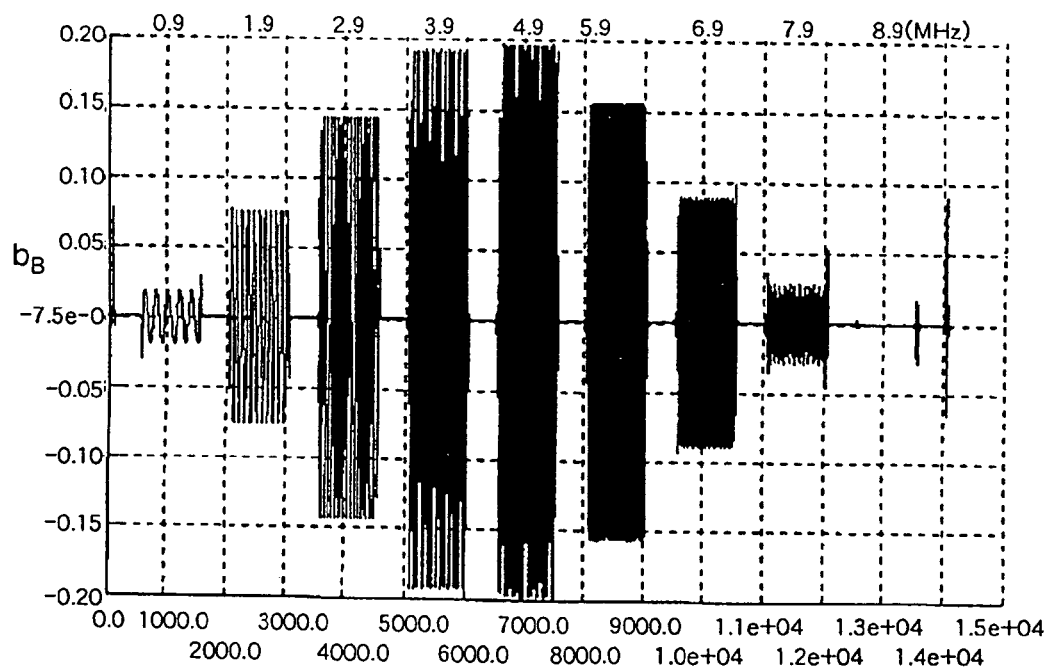
FIGS. 39-42 are graphs similar to those of FIGS. 34-37, respectively, but showing the signals at respective points in the circuit of FIG. 32 when the burst wave video signal of FIG. 38 is input thereto.
Figure 40:
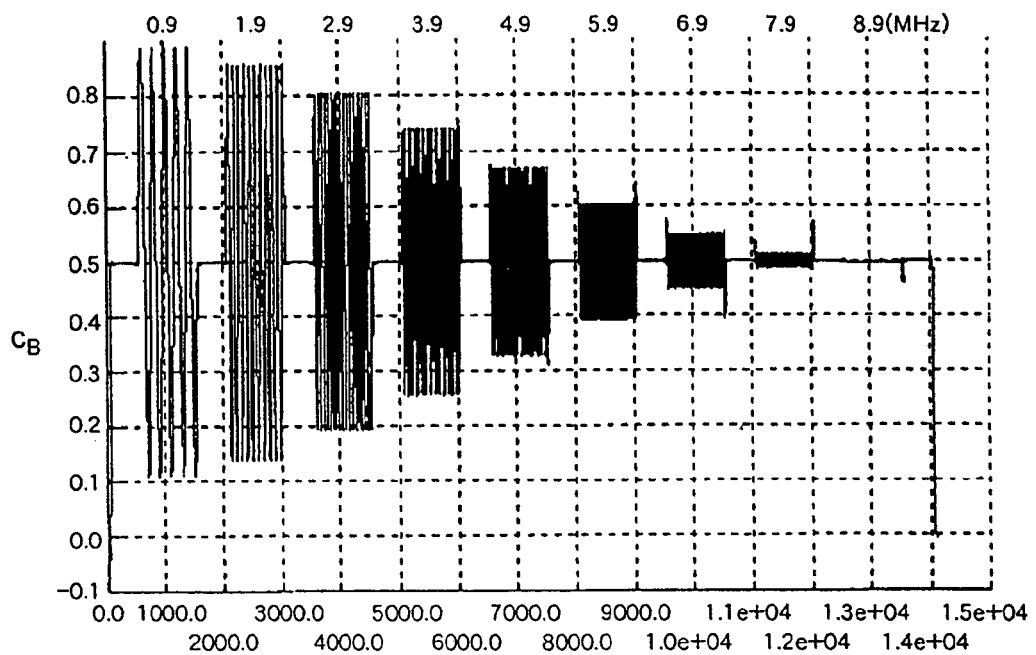
Figure 41:
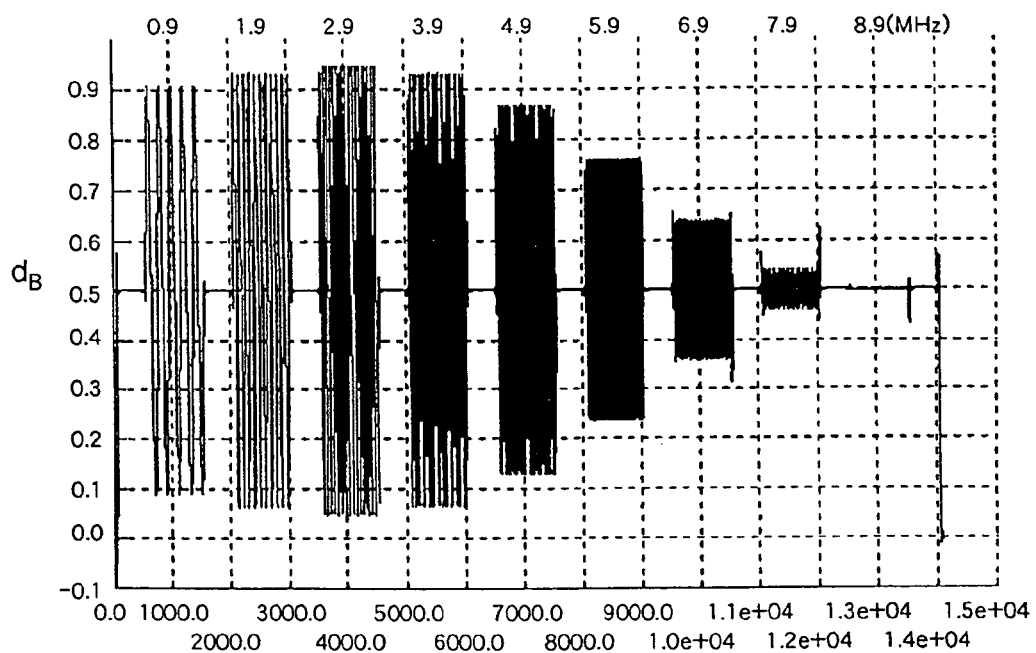
Figure 42:
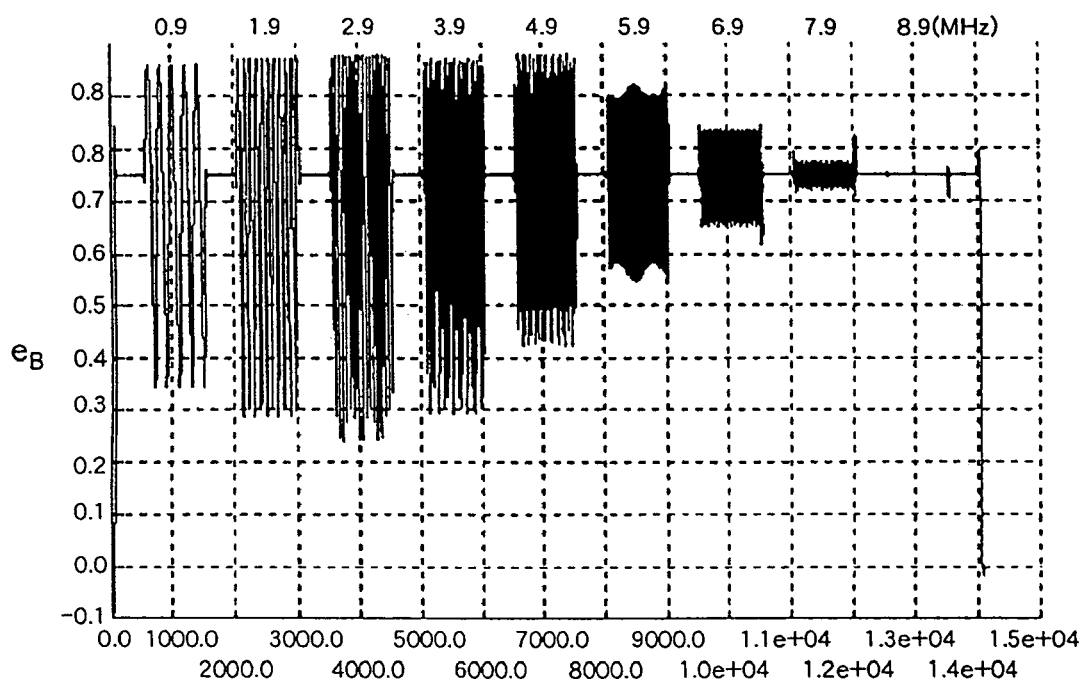

The high pass filter 62, as noted above, represents the image contour signal processing and yields the image contour signal ($D_s$) shown in FIG. 7. The LPF 63, gamma inclination circuit 65 and multiplier 66 represent the gamma correction of the image contour signal. The LPF 63 filters the digitized signal ($A_s$) and generates the signal ($E_s$) shown in FIG. 8. Thus, the high frequency components of the low pass filtered signal ($E_s$) are attenuated and the signal ($E_s$) is sent to the gamma inclination circuit 65. The gamma inclination circuit 65 selects a straight-line segment as the gamma correction function for the high frequencies and selects the non-linear gamma function for the low frequencies of the video-signal, thereby producing the signal ($F_s$) shown in FIG. 9. It will be noted that the signal ($F_s$) representing the straight-line segment intersecting the origin of the gamma correction function follows a roughly linear outline. The multiplier 66 applies the signal ($F_s$) to the image contour signal ($D_s$) by multiplying the signals together, and the resulting signal ($G_s$) of FIG. 10 is sent to the adder 68. The gamma corrected video signal ($C_s$) is combined by the adder with the gamma corrected image contour signal ($G_s$) resulting in the corrected signal ($H_s$) shown in FIG. 11. From comparing the output signal ($H_s$) of the circuit embodying the present invention with the output signal ($e_s$) generated by the known video camera of FIG. 29, it will be appreciated that the present invention does not suffer from the distortion shown in FIG. 37. Therefore, the present invention provides gamma correction of both the video signal and the image contour signal while avoiding the deleterious affects of aliasing.

Figure 19:
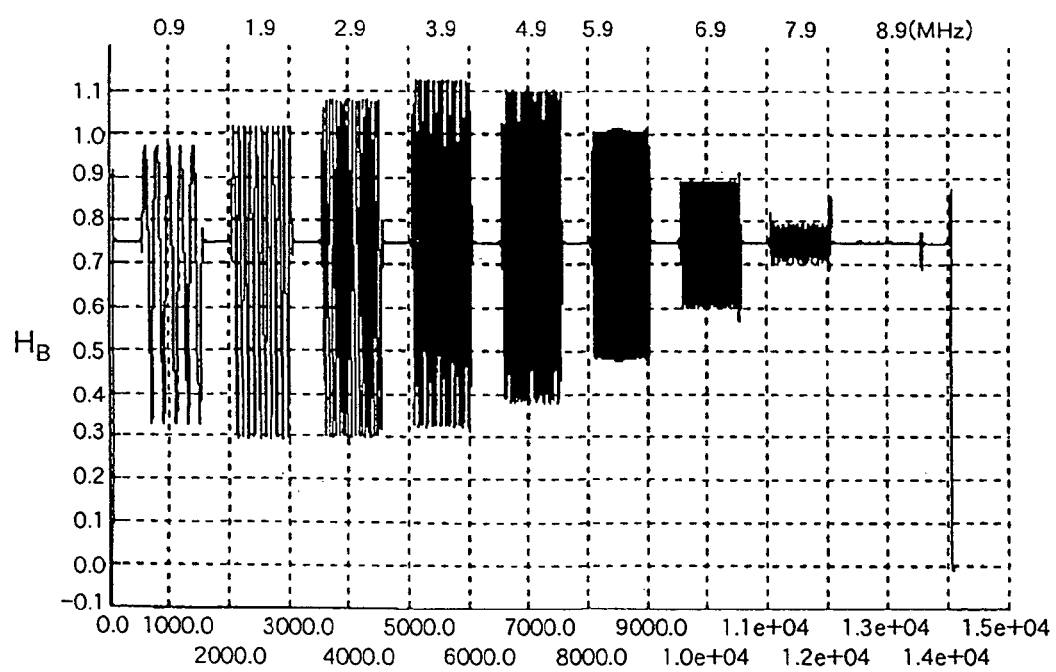

The same desirable results are achieved when the input video signal is in the form of a burst wave video signal. The burst wave video signal is input and digitized into the signal ($A_B$) shown in FIG. 12. The digitized signal is fed through the LPF 64 yielding the filtered signal ($B_B$) of FIG. 13 (which corresponds to the signal in FIG. 5). This filtered signal ($B_B$) is processed by the gamma circuit 67 yielding the gamma corrected signal ($C_B$) shown in FIG. 14 (which corresponds to the signal in FIG. 6). The digitized signal is also processed by the HPF 62 and the LPF 63 yielding the signals ($D_B$, $E_B$) shown in FIGS. 15 and 16, respectively (corresponding to FIGS. 7 and 8). The filtered signal ($E_B$) is processed by the gamma inclination circuit 65 producing the signal ($F_B$) of FIG. 17 (corresponding to FIG. 9). The signals ($D_B$) and ($F_B$) are multiplied together by multiplier 66 resulting in the signal ($G_B$) shown in FIG. 18 (corresponding to FIG. 10). The signals ($C_B$) and ($G_B$) are added by adder 68 to yield the signal ($H_B$) shown in FIG. 19 (which corresponds to the signal of FIG. 11). As with the resultant signal of FIG. 11, the resultant burst wave video signal of FIG. 19 is also free of the effects of aliasing. Thus, the present invention prevents aliasing equally well for both the input video signal of FIG. 4 and the input burst wave video signal of FIG. 12.

In the actual configuration of the gamma correction circuit 34 shown in FIG. 20, the output data from the knee correction circuit 33 shown in FIG. 1 is applied to a terminal 70. High band pass limitation is applied to the data from terminal 70 by a low pass filter (LPF) 71. Further, the data input through the terminal 70 is sent through a multiplier 73 and an adder 74 to an output terminal 75. An output from the LPF 71 is sent to a coefficient generating circuit 72, in which the inclination (a) and the intercept (b) are determined in correspondence to the input level. The data of the inclination (a) is supplied as a multiplying coefficient to the multiplier 73, and the data of the intercept (b) is added to the output data of the multiplier 73 in the adder 74.

Further, the coefficient generating circuit 72 may be actually constituted as shown in FIG. 21, in which the output of the LPF 71 is supplied through a terminal 80 to a level comparator 81 for measuring an output level of the LPF 71. The output of the level comparator 81 is supplied to a coefficient (a) table 82 and an intercept (b) table 83. Data of the coefficient (a) corresponding to the measured level is read out from the coefficient (a) table 82. Data of the intercept (b) corresponding to the measured level is read out from the intercept (b) table 83.

In the digital signal processing camera in accordance with the present invention as described above with reference to FIG. 1, in order to suppress image degradation brought about by the folding component resulting from the non-linear processing, such as, the knee correction, the black/white clip and others, in addition to the specifically mentioned gamma correction, a sampling frequency in a non-linear processing area is made higher, for inhibiting induction of folding components within a single band. More particularly, in the digital signal processing camera of FIG. 1, the so-called zero technique is used for up-converting or increasing the sampling frequency of the digital video signal, and such technique will now be described in more detail with reference to FIGS. 22-28.

Figure 22:
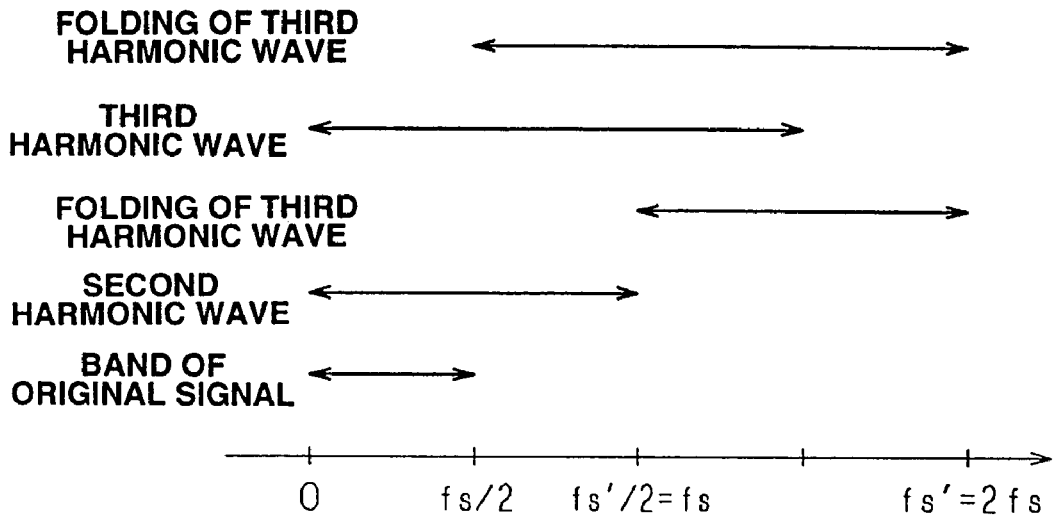
FIG. 22 is a diagram to which reference will be made in describing how frequency up-conversion may be employed for avoiding the production of a folding component in non-linear processing.

In order to reconstruct the video signal from a sampled video signal, the sampling rate must be at least the Nyquist rate. Another way to visualize this is by observing the bandwidths of each harmonic. As shown in FIG. 22, the bandwidth of the LPF 22 (FIG. 1), for example, isolates contour signals in the vertical direction and is different from the band limitation of the LPF 26, which isolates contour signals in the horizontal direction. Meanwhile, the LPF 31 generates video signals which require a separate band pass limitation. While the embodiment depicted in FIG. 1 shows one particular arrangement, it is possible to position the low pass filters immediately after the respective zero insertion circuits 18, 19 and 20 for carrying out the same operation.

It is note-worthy that the particular type of video camera envisioned as embodying the present invention attenuates harmonics lying outside the desired band limitation area (for example, by use of a low pass filter). Since this type of video camera does not produce a high gain, there is essentially no problem arising from the zero insertion technique.

Figure 25A:
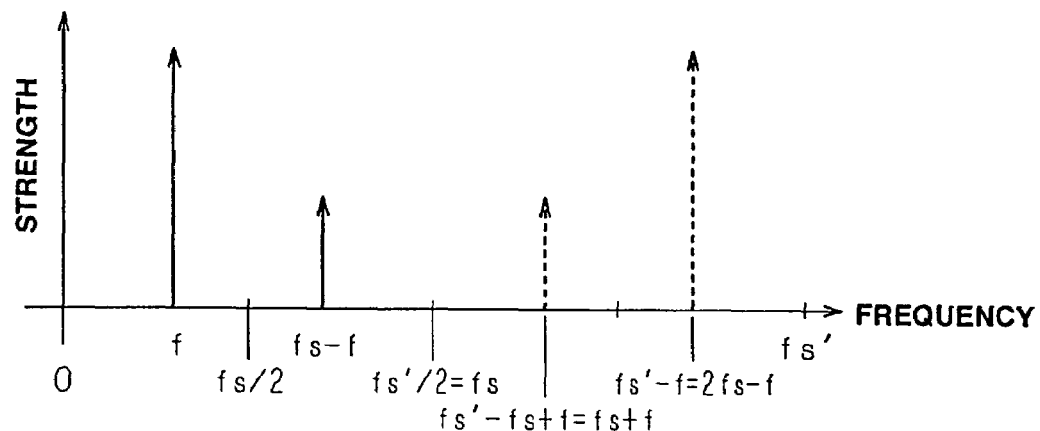
FIGS. 25A and 25B illustrate harmonic components and folding components that may remain after the processing of FIGS. 23A and 23B.
Figure 25B:
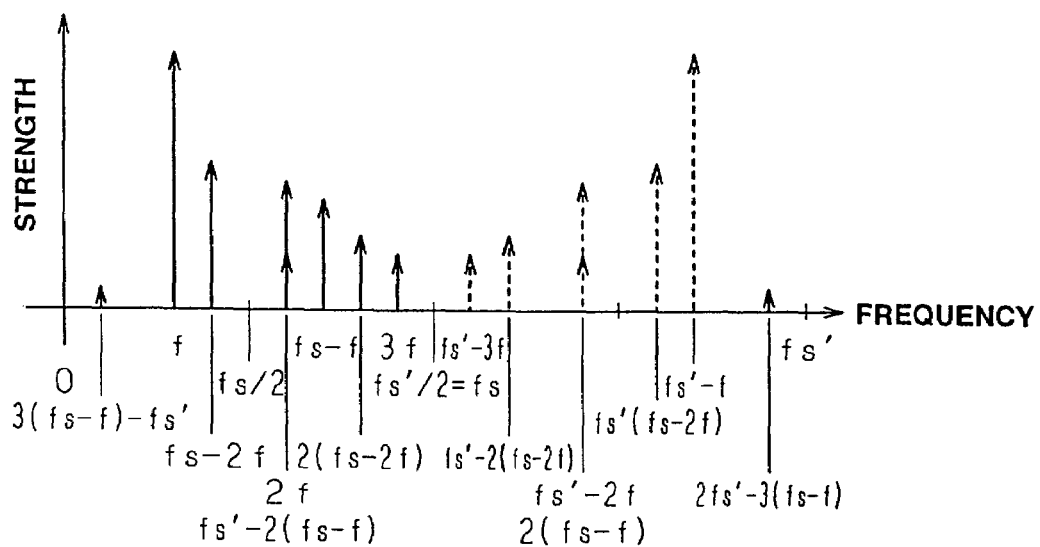

In any event, the problem of frequency harmonics falling outside the frequency range $f_s/2$ should be carefully treated. As shown in FIGS. 25A and 25B, the unwanted frequency harmonics result in folding components within the desired band limitation area. For example, the second harmonic ($f_s$–f) shown in FIG. 25A generates its own harmonics at frequencies ($f_s$–f) and 3($f_s$–f). The folding components of the ($f_s$–f) harmonics are shown as the signals at $f_s'$–2($f_s$–f) and 3($f_s$–f)–$f_s'$ in FIG. 25B. It will be noted that the unwanted signal at the frequency 3($f_s$–f)–$f_s'$ is within the desired band limitation. In other words, if the LPFs 22, 26 and 36 do not sufficiently attenuate the harmonics in a frequency range greater than $f_s/2$, the second harmonic ($f_s$–f) will result in the folding component at the frequency 3($f_s$–f)–$f_s'$ and an image distortion occurs. In addition, the second harmonic is also folded about the frequency $f_s/2$, resulting in a folding harmonic ($f_s$–2f). As shown in FIG. 25B, this unwanted folding harmonic at frequency ($f_s$–2f) is also within the desired band limitation area ($f_s/2$) and, therefore, produces an image distortion.

Therefore, it is imperative that the band limitation for each of the low pass filters includes a sharp cut-off at the frequency $f_s/2$ to ensure that the unwanted folding harmonics do not "leak" into the desired band limitation area and cause an image distortion. The cut-off of the low pass filters must not only be sharp, but approach the frequency $f_s/2$ very closely. For example, assume that the frequency f of the ordinal (i.e., original) video signal=$f_s/2+\alpha$, where $\alpha$ is a slight deviation from the frequency $f_s/2$ (i.e., $\alpha<<f_s/2$), that is, f is slightly greater than the folding frequency $f_s/2$. The folding component of f folded about the sampling frequency $f_s$ is the signal at frequency ($f_s$–f) shown in FIG. 25B. This folding component, in turn, is folded about the frequency $f_s/2$ producing a second folding component at ($f_s$–2f). Since $\alpha=f-f_s/2$, solving the equation $f_s$–2f for $\alpha$ yields –2$\alpha$. Therefore, when $\alpha$ is very small, the second folding component approaches zero (as in the case of a direct current) and a severe folding distortion occurs.

Now assuming that the ordinal frequency f=$f_s/3+\alpha$($\alpha<<f_s/2$), then the folding component at the third order harmonic of the folding component ($f_s$–f) from $f_s$ is the signal at 3($f_s$–f)–$f_s'$ shown in FIG. 25B. Solving for $\alpha$, this equation yields 3$\alpha$. When $\alpha$ is very small, the folding component approaches zero (as in a direct current) and again causes a severe folding distortion. In the case of f=$f_s/3+\alpha$, a second order folding component from $f_s$($f_s$=f) also arises. This additional folding component is positioned at frequency $f_s$–2f (FIG. 25B) and, solving for f, yields $f_s/3-2\alpha$. Thus, when $\alpha$ approaches zero, the folding component of the second harmonic is near $f_s/3$ within the desired gamma limitation area ($f_s/2$) and causes an additional folding distortion.

In the case where f=$f_s/4+\alpha$ ($\alpha$ is $<<f_s/2$), the second harmonic is positioned at ($f_s/3+\alpha$) and its folding component is ($f_s$–2f) or ($f_s/2-\alpha$). In such case, the folding component of the second harmonic is just within the desired band limitation area ($f_s/2$) when $\alpha$ approaches zero.

In each of the above instances, the second harmonic generates folding components within the desired band limitation area. Therefore, it is preferred that attenuation factors in the vicinities of the second harmonic for each of these instances (i.e., at frequencies $f_s/2$, $2f_s/3$ and $3f_s/4$) be set as large as possible.

However, low pass filters are defined for a single band, the present case being within the frequency band ($f_s/2$). As a solution for attenuating the second harmonics at the frequencies ($2f_s/3$) and ($3f_s/4$), the sampling is carried out in advance at a frequency ($f_s$) higher than a necessary band. This solution tends to make the attenuation factor in the vicinity of the frequency ($f_s/2$) larger, thereby adequately attenuating all unwanted harmonics.

FIGS. 26A and 26B depict the band pass limitations of filters which have gradual and sharp cut-off characteristics, respectively. It will be appreciated that the filter with the gradual cut-off shown in FIG. 26A will not prevent the described image distortion. In situations where a gradual cut-off of the filter cannot be altered, however, the folding distortion component may be removed by substituting the color signals R+G for the high band component by applying space pixel shifting to the CCD image sensor 10 (FIG. 1), for example. By removing the high band component in this manner, the folding distortion components do not appear and an image distortion is prevented.

It will be appreciated, however, that the space pixel shifting technique has little influence in reality because the CCD image sensor suffers from a magnification chromatic aberration at the peripheral portion of the screen. This aberration generates high frequency components along the periphery of the screen, resulting in a folding distortion. It will be noted that the screen periphery distortion may be an acceptable alternative, however, because it is smaller by a factor of ten than the image distortion resulting from the described up-conversion.

As a practical matter and as previously mentioned, the CCD image sensing device 10 comprises three channels of 500,000 pixels each. Due to the high number of pixels per screen, the sampling frequency ($f_s$) is at a maximum and, therefore, the up-conversion frequency ($f_s'$) cannot be made too high. This is not a problem, however, because the signal band of the CCD image sensing or pickup device is limited to a range from DC to 6 MHz according to the CCIR Recommendation 601. Thus, the attenuation factor is set in the present invention at the frequency equal to or more than 9 MHz (FIG. 26B) to prevent any folding distortion. Therefore, even if a signal as shown in FIG. 27A is input to the non-linear processing circuit, only the ordinal signal at the frequency (f) and its natural harmonics are induced.

Figure 28A:
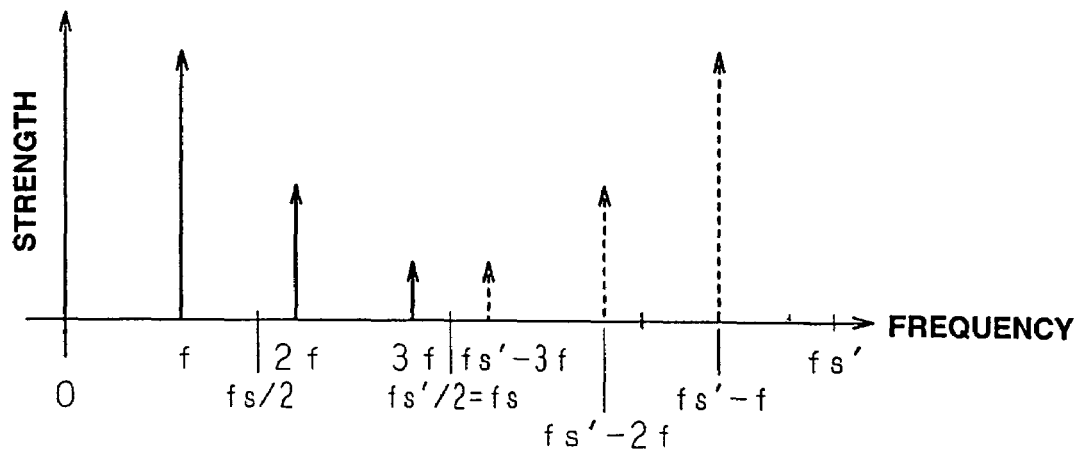
FIGS. 28A, 28B and 28C are diagrams to which reference will be made in describing a process of down-converting the digital signal processed by the zero insertion and the low pass filtering shown in FIGS. 23A and 23B.
Figure 28B:
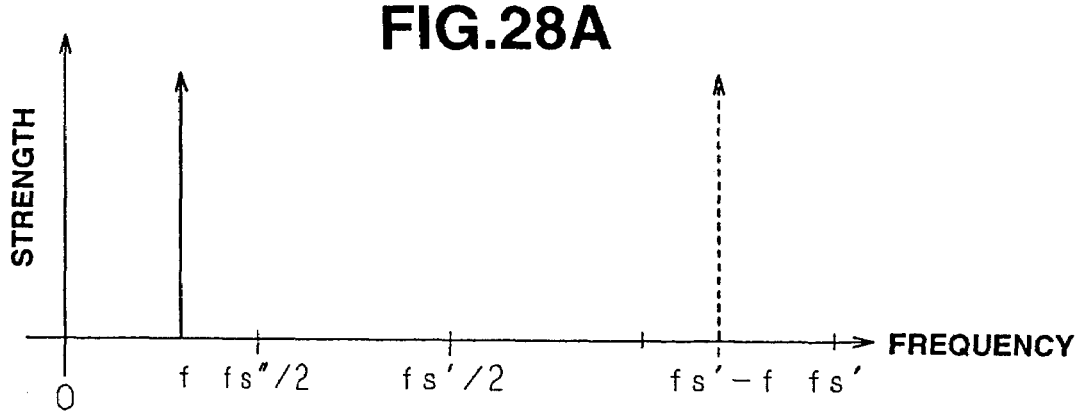
Figure 28C:
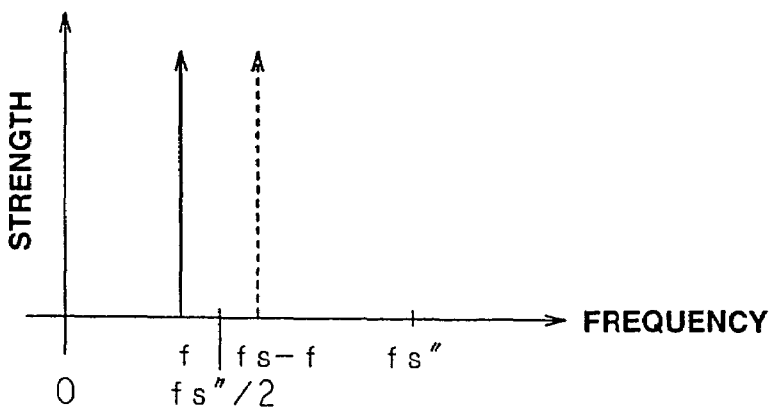

Post-processing of the video signal after non-linear processing will now be discussed. The post-processing consumption of power is proportional to the sampling frequency. In order to reduce the consuming of power, therefore, the sampling frequency is down-converted (or decimated), as in the circuit 37, before post-processing. Harmonic components are folded, however, when a decimation process is performed, giving rise to aliasing. Therefore, the LPF 36 is provided in advance of the decimation circuit 37 to eliminate this folding image distortion. This can be seen from FIGS. 28A, 28B and 28C, wherein the signal after the B/W clip circuit 35 (FIG. 1) is shown in FIG. 28A. The LPF 36 filters out the second and third harmonics, leaving the ordinal signal at the frequency (f) intact as shown in FIG. 28B. The down-conversion or decimation is performed in circuit 37 by digitally sampling the signal after low pass filtering at a lower sampling rate ($f_s''$), as shown in FIG. 28C.

It will be noted that the folding component of the ordinal signal at frequency (f) is down-shifted to the frequency ($f_s$−f). When the down-conversion sampling frequency ($f_s''$) is greater than the frequency ($f_s/2$), the LPF 36 filters out the high frequency components at frequencies greater than ($f_s/2$) as before. On the other hand, where the down-conversion frequency ($f_s''$) is smaller than the frequency ($f_s/2$), the LPF 36 must filter out high frequency components with frequencies greater than the frequency ($f_s''/2$) in order to cancel the folding distortion components in the area between the frequencies ($f_s''/2$ and $f_s/2$).

It will be appreciated that the down-conversion frequency ($f_s''$) does not have to return to the original sampling frequency ($f_s$). For example, the original sampling frequency ($f_s$) may be set to 18 Mhz (in correspondence to the horizontal driving frequency of the CCD in the sensing or pickup device 10 with 500,000 pixels), while the non-linear processing frequency ($f_s'$) may be set to 36 MHz (which is twice the original sampling frequency). The down-conversion frequency ($f_s''$) is, then, set to 13.5 MHz to be in accordance, for example, with a serial digital communication standard. It is to be understood that other frequency settings are possible to suit other situations.

Thus, the present invention provides an anti-aliasing video camera for preventing aliasing arising from high frequency folding distortion, especially due to non-linear processing.

Although an illustrative embodiment of the invention has been described in detail herein with reference to the accompanying drawings, it is to be noted that the invention is not limited to that embodiment, and that various changes and modifications may be affected therein by one skilled in the art without departing from the scope and spirit of the invention which is intended to be defined by the appended claims.

The invention claimed is:

1. A digital video signal processing apparatus for modifying an amplitude level of said digital video signal according to a non-linear curve comprising:

low pass filter means to which said digital video signal is supplied to produce a filtered digital video signal;

coefficient generating means for generating a multiplying coefficient and an adding coefficient from a respective linear expression of one of line segments of the non-linear curve, each of said line segments being expressed by dividing said non-linear curve into a plurality of sections and replacing each of said sections with a respective line segment which can be expressed as a linear expression to form a succession of line segments;

multiplying means for multiplying said amplitude level of said digital video signal by said multiplying coefficient; and adding means for adding an output of said multiplying means and said adding coefficient, wherein the filtered digital video signal that has a frequency higher than a predetermined frequency is attenuated in the low pass filter means to have an amplitude smaller than a deviation between two successive sampling points on the non-linear curve.

2. The digital video signal processing apparatus of claim 1, wherein said coefficient generating means includes:

means for detecting an amplitude level of said filtered digital video signal;

means for selecting said one of the line segments corresponding to the detected amplitude level; and means for outputting said multiplying coefficient and said adding coefficient of the linear expression of said one of said line segments.

3. The digital video signal processing apparatus of claim 1, wherein said non-linear curve represents a gamma correction function.

4. The digital video signal processing apparatus of claim 1, further comprising zero insertion means for up-converting the frequency of said digital video signal and thereby effectively increasing the sampling rate of said digital video signal.

5. A digital video signal processing apparatus for modifying an amplitude level of said digital video signal according to a non-linear curve comprising:
- a low pass filter to which said digital video signal is supplied to produce a filtered digital video signal;
- a generator for generating a multiplying coefficient and an adding coefficient from a respective linear expression of one of line segments of the non-linear curve, each of said line segments being expressed by dividing said non-linear curve into a plurality of sections and replacing each of said sections with a respective line segment which can be expressed as a linear expression to form a succession of line segments;
- a multiplier for multiplying said amplitude level of said digital video signal by said multiplying coefficient; and
- an adder for adding an output of said multiplier and said adding coefficient,
- wherein the filtered digital video signal that has a frequency higher than a predetermined frequency is attenuated in the low pass filter to have an amplitude smaller than a deviation between two successive sampling points on the non-linear curve.

6. The digital video signal processing apparatus of claim 5, wherein said generator includes:
- a detector for detecting an amplitude level of said filtered digital video signal;
- a selector for selecting said one of the line segments corresponding to the detected amplitude level; and
- an output for outputting said multiplying coefficient and said adding coefficient of the linear expression of said one of said line segments.

7. The digital video signal processing apparatus of claim 5, wherein said non-linear curve represents a gamma correction function.

8. The digital video signal processing apparatus of claim 5, further comprising a zero inserter for up-converting the frequency of said digital video signal and thereby effectively increasing the sampling rate of said digital video signal.

9. A digital video signal processing method for modifying an amplitude level of said digital video signal according to a non-linear curve, said method comprising the steps of:
- low pass filtering said digital video signal to produce a filtered digital video signal;
- generating a multiplying coefficient and an adding coefficient from a respective linear expression of one of line segments of the non-linear curve, each of said line segments being expressed by dividing said non-linear curve into a plurality of sections and replacing each of said sections with a respective line segment which can be expressed as a linear expression to form a succession of line segments;
- multiplying said amplitude level of said digital video signal by said multiplying coefficient; and
- adding an output of said multiplying step and said adding coefficient,
- wherein the filtered digital video signal that has a frequency higher than a predetermined frequency is attenuated in the low pass filter step to have an amplitude smaller than a deviation between two successive sampling points on the non-linear curve.

10. The digital video signal processing method of claim 9, wherein said step of generating the multiplying and adding coefficients includes the steps of:
- detecting an amplitude level of said filtered digital video signal;
- selecting said one of the line segments corresponding to the detected amplitude level; and
- outputting said multiplying coefficient and said adding coefficient of the linear expression of said one of said line segments.

11. The digital video signal processing method of claim 9, wherein said non-linear curve represents a gamma correction function.

12. The digital video signal processing method of claim 9, further comprising the step of up-converting the frequency of said digital video signal and thereby effectively increasing the sampling rate of said digital video signal.

* * * * *